US011676143B2

(12) United States Patent
Joveski et al.

(10) Patent No.: US 11,676,143 B2
(45) Date of Patent: Jun. 13, 2023

(54) SYSTEMS AND METHODS FOR BLOCKCHAIN TRANSACTION MANAGEMENT

(71) Applicant: Coinbase, Inc., San Francisco, CA (US)

(72) Inventors: Bojan Joveski, San Francisco, CA (US); Alexander Kern, San Francisco, CA (US); Vipul Patil, San Francisco, CA (US); Sahil Amoli, San Francisco, CA (US); Justin O'Brien, San Francisco, CA (US); Peter Jihoon Kim, San Francisco, CA (US); Daniel Que, San Francisco, CA (US); Tyson Battistella, San Francisco, CA (US); Nikhil Srinivasan, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 99 days.

(21) Appl. No.: 16/877,278

(22) Filed: May 18, 2020

(65) Prior Publication Data

US 2020/0364703 A1     Nov. 19, 2020

Related U.S. Application Data

(60) Provisional application No. 62/892,795, filed on Aug. 28, 2019, provisional application No. 62/880,461, filed on Jul. 30, 2019, provisional application No. 62/849,101, filed on May 16, 2019.

(51) Int. Cl.
*G06Q 40/00* (2023.01)
*G06Q 20/38* (2012.01)
*G06Q 20/36* (2012.01)

(52) U.S. Cl.
CPC .......... *G06Q 20/389* (2013.01); *G06Q 20/36* (2013.01)

(58) Field of Classification Search
CPC ...... G06Q 20/389; G06Q 20/36; G06Q 20/02; G06Q 20/3678; G06Q 2220/00; G06Q 20/065
See application file for complete search history.

(56) References Cited

U.S. PATENT DOCUMENTS

| 10,269,009 | B1   | 4/2019  | Winklevoss et al. |
| 10,915,891 | B1 * | 2/2021  | Winklevoss ....... G06Q 20/3678 |
| 10,929,931 | B1 * | 2/2021  | Bryant ................. H04L 9/0643 |
| 10,949,926 | B1 * | 3/2021  | Call ....................... G06Q 40/08 |
| 11,423,398 | B1 * | 8/2022  | Mullins ................. G06Q 20/36 |
| 2015/0324789 | A1 | 11/2015 | Dvorak et al. |
| 2017/0187535 | A1 | 6/2017  | Middleton et al. |
| 2018/0078843 | A1 * | 3/2018 | Tran ................... G09B 19/0038 |

(Continued)

FOREIGN PATENT DOCUMENTS

WO     WO-2019191687 A1 *  10/2019    ............. G06Q 40/00

OTHER PUBLICATIONS

Chen et al: "Under-optimized smart contracts devour your money", in: 2017 IEEE 24th International Conference on Software Analysis, Evolution and Reengineering (SANER), Feb. 20-24, 2017 (Year: 2017).*

(Continued)

*Primary Examiner* — Edward J Baird
(74) *Attorney, Agent, or Firm* — Perkins Coie LLP

(57) ABSTRACT

Systems and methods for payment processing using cryptocurrency assets.

16 Claims, 15 Drawing Sheets

(56) References Cited

U.S. PATENT DOCUMENTS

| | | | | |
|---|---|---|---|---|
| 2018/0227116 | A1* | 8/2018 | Chapman | G06F 8/71 |
| 2018/0276626 | A1 | 9/2018 | Laiben | |
| 2018/0293578 | A1* | 10/2018 | Gardner | G06Q 20/401 |
| 2018/0349621 | A1* | 12/2018 | Schvey | G06F 21/645 |
| 2019/0164153 | A1* | 5/2019 | Agrawal | G06Q 20/383 |
| 2019/0205870 | A1* | 7/2019 | Kamalsky | G06Q 20/3829 |
| 2019/0220859 | A1 | 7/2019 | Weight et al. | |
| 2019/0268165 | A1 | 8/2019 | Monica et al. | |
| 2019/0287174 | A1 | 9/2019 | Black et al. | |
| 2019/0303922 | A1* | 10/2019 | Hamasni | H04L 9/3239 |
| 2019/0318433 | A1* | 10/2019 | McGee | H04L 9/0643 |
| 2019/0333051 | A1 | 10/2019 | Brogger | |
| 2019/0340685 | A1* | 11/2019 | Wade | G06Q 20/4014 |
| 2020/0005284 | A1* | 1/2020 | Vijayan | G06Q 20/02 |
| 2020/0052899 | A1* | 2/2020 | Finlow-Bates | H04L 9/3239 |
| 2020/0084026 | A1* | 3/2020 | Reading | H04L 9/3239 |
| 2020/0143369 | A1* | 5/2020 | Hu | G06Q 10/02 |
| 2020/0167769 | A1* | 5/2020 | Green | G06Q 20/3825 |
| 2020/0201683 | A1* | 6/2020 | Muskal | H04L 9/0894 |
| 2020/0266997 | A1 | 8/2020 | Monica et al. | |
| 2020/0380505 | A1* | 12/2020 | Shah | H04L 9/321 |
| 2020/0380520 | A1* | 12/2020 | Kavali | G06Q 20/02 |
| 2021/0058353 | A1* | 2/2021 | Creech | H04L 51/212 |
| 2021/0160069 | A1* | 5/2021 | Watanabe | G06F 21/64 |

OTHER PUBLICATIONS

Murray et al: "EIP-1167: Minimal Proxy Contract", Ethereum Improvement Proposals, Jun. 22, 2018 (Year: 2018).*

"An analysis of batching in Bitcoin", Coin Metrics team, May 20, 2018, https://coinmetrics.io/batching/.

"BitAuth, for Decentralized Authentication", bitty, Engineering, Jul. 1, 2014, https://bitpay.com/blog/bitauth-for-decentralized-authentication/.

"BitPay Introduces Stable Coin Settlements in Gemini Dollars and Circle USD Coin", https://bitpay.com/blog/stable-coin-settlement/, Oct. 15, 2018.

"Coinbase Commerce API", https://web.archive.org/web/20180507175332/http://commerce.coinbase.com/docs/.

"Integrate crypto payments into your .Net applications with AtomicPay", https://msicc.net/integrate-crypto-payments-into-your-net-applications-with-atomicpay/, Jan. 10, 2019.

"ERC20 Token Payment Processing—Powered by CoinPayments", https://blog.coinpayments.net/announcements/erc20-token-payment-processing-powered-by-coinpayments, May 28, 2018.

Andrews, Jordan, "The CREATE2 OpCode and DApp Onboarding in Ethereum", https://hackernoon.com/the-create2-opcode-and-dapp-onboarding-in-ethereum-e2178e6c20cb, Jan. 12, 2019.

Faridi, Omar, "Global Cryptocurrency Payments Solution to Support 156 Crypto-to-Fiat Options", https://www.cryptoglobe.com/latest/2019/01/non-custodial-crypto-payment-solution-launched-by-atomicpay/, Jan. 13, 2019.

Gogo, Jeffrey, "Thai Startup Atomicpay Launches Non-Custodial Cryptocurrency Payments Platform", https://news.bitcoin.com/thai-startup-atomicpay-launches-non-custodial-crpto-payment-platform/ Jan. 12, 2019.

Petersen, Cole, "Coinbase Commerce Announces Addition of New Features, Faces Increasing Competition", Cryptocurrency Technology, Aug. 3, 2018, (https//www.newsbtc.com/category/crypto-tech/).

Strelov, Aleksandr, "Accepting payments in Ethereum and ERC20 tokens", steemit, https://steemit.com/cryptocurrency/@ivelon/accepting-payments-in-ethereum-and-erc20-tokens.

"Merchant Payment Gateway", Coingate, https://developer.coingate.com.

* cited by examiner

```
contract ForwarderFactory {
  function initForwarder(address destination, uint256 salt)
      public returns (Forwarder forwarder) {
    bytes memory deploymentData = abi.encodePacked(
      type(Forwarder).creationCode,
      uint256(destination)
    );

assembly {
      forwarder := create2(
        0x0, add(0x20, deploymentData), mload(deploymentData), salt
      )
    }
  } function cloneForwarder(address forwarder, uint256 salt)
      public returns (Forwarder clonedForwarder) {
    address clonedAddress = createClone(forwarder, salt);
    Forwarder parentForwarder = Forwarder(forwarder);
    clonedForwarder = Forwarder(clonedAddress);

clonedForwarder.init(parentForwarder.destination());
  } function createClone(address target, uint256 salt) private returns (address result) {
    bytes20 targetBytes = bytes20(target);
    assembly {
      let clone := mload(0x40)
      mstore(clone, 0x3d602d80600a3d3981f3363d3d373d3d3d363d730000000000000000000000000000)
      mstore(add(clone, 0x14), targetBytes)
      mstore(add(clone, 0x28), 0x5af43d82803e903d91602b57fd5bf30000000000000000000000000000000000000000)
      result := create2(0, clone, 0x37, salt)
    }
  }
}
```

FIGURE 6

SYSTEMS AND METHODS FOR BLOCKCHAIN TRANSACTION MANAGEMENT

CROSS-REFERENCE TO RELATED APPLICATIONS

This application claims priority to U.S. Provisional Application No. 62/849,101, filed 16 May 2019, U.S. Provisional Application No. 62/880,461, filed 30 Jul. 2019, and U.S. Provisional Application No. 62/892,795, filed 28 Aug. 2019, which are each incorporated herein in its entirety by this reference.

TECHNICAL FIELD

This disclosure herein relates generally to the cryptocurrency transaction field, and more specifically to a new and useful system and method for cryptocurrency transaction management.

BACKGROUND

Blockchains are linked lists of blocks, that can record ownership of assets, such as cryptocurrencies, non-fungible tokens (NFTs), and the like.

There is a need in the computer networking field to create a new and useful systems and methods for blockchain transaction management. This disclosure provides such new and useful systems and methods.

BRIEF DESCRIPTION OF THE FIGURES

FIG. 6 is code of an exemplary smart contract, in accordance with embodiments.

DESCRIPTION OF THE PREFERRED EMBODIMENTS

Figure 1A:
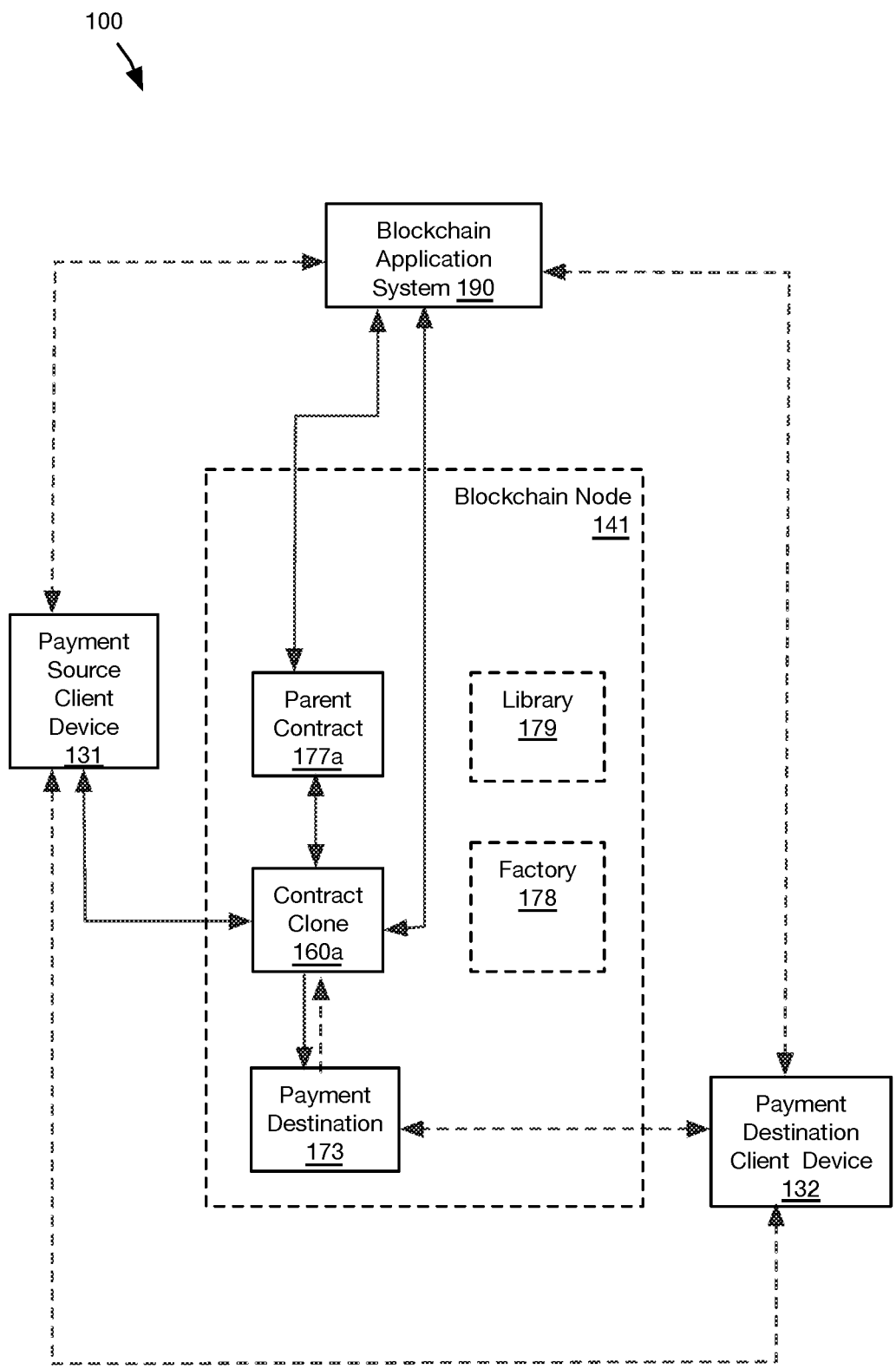
FIGS. 1A-D are schematic representations of systems, in accordance with embodiments.

The following description of embodiments is not intended to limit the claims to these embodiments, but rather to enable any person skilled in the art to make and use embodiments described herein.

1. Overview.

In contrast to blockchains that rely on the UTXO (Unspent Transaction Output) model, in account-based systems, each public/private key pair has exactly one on-chain address (e.g., an address recorded on the blockchain), and therefore all transactions have one "from" and one "to" address. While accounts simplify the process of generating transactions, they make attributing payments to a transaction (e.g., a sale at a Point of Sale Terminal, an on-line sale, etc.) more difficult as compared with blockchain systems (e.g., blockchain systems having a UTXO model) that can more easily support generation of a unique address for each transaction (e.g., by using an HD (hierarchical deterministic) wallet. This stems from the fact that transactions in an account-based blockchain system do not ordinarily record information that can be used to identify an associated transaction. Splitting funds into multiple seller wallets or addresses to simulate a UTXO model might lead to poor seller experience and high operational costs (e.g., Ethereum "gas" costs, blockchain transaction costs, smart contract processing costs, etc.).

The system can include at least one of: a blockchain application system (e.g., a single-tenant system, a multi-tenant platform, etc.), a payment source client (e.g., a buyer or purchaser device running a digital wallet, a browser application, a native application, etc.), a payment destination client (e.g., a merchant or seller device running a digital wallet, point of sale application, shopping cart application, etc.), and a blockchain node. The blockchain node can include a copy of a blockchain used by a blockchain network, and the blockchain can include data and/or machine executable instructions for one or more of a smart contract, a clone of the smart contract, a blockchain destination (e.g., a blockchain account, a blockchain address), a smart contract factory, and a smart contract library. However, the system and blockchain node can include any suitable components.

At least one component of the system can perform at least a portion of the method.

The method can include at least one of: configuring payment processing for a payment destination; receiving a payment request; providing a proxy blockchain destination (e.g., a blockchain address or account predetermined for a smart contract that has not yet been deployed on the blockchain); detecting transfer of payment to the proxy blockchain destination; generating a payment event; deploying a smart contract (e.g., that functions to transfer assets from the proxy blockchain destination to the payment destination); transferring payment from the proxy blockchain destination to the payment destination (e.g., a blockchain address or account of a seller or merchant providing services to the buyer or purchaser that transfers the payment to the proxy blockchain destination).

2. Benefits.

This method can confer several benefits over conventional systems.

First, payments using tokens (e.g., ERC20 tokens, stablecoins such as USDC and DAI) can be provided in a non-custodial manner. For example, the smart contract can function to forward the tokens received at the proxy blockchain destination to a non-custodial payment destination. The payment destination can be hard-coded in the smart contract, such that the tokens held by the proxy blockchain destination can only be forwarded to the payment destination, which can be a payment destination managed by a merchant or seller. Alternatively, the payment destination can be received as part of a request received by the smart contract or otherwise determined. In this manner, no-custodial payment processing using tokens can be provided.

Second, payments can be associated with a transaction by using a smart contract for each transaction (e.g., without requiring a payment source wallet to include an invoice identifier in a payment transaction). Conventional wallet applications with limited functionality (e.g., exchange-hosted wallets) can be used to make payments using tokens.

For example, payment for an on-line sale transaction or point-of-sale transaction can be made by transferring a token to the smart contract address by using an exchange-hosted wallet application, and payment for the on-line sale transaction or point-of-sale transaction can be confirmed by using the smart contract associated with the payment.

Third, costs associated with implementations that involve deploying smart contracts can be reduced or delayed by deploying the smart contract after generating the proxy blockchain destination. In this manner, deployment of the smart contract (and payment of associated deployment costs) can be deferred until payment has been received from the payment source, or until an entity that manages the payment destination requests payment settlement.

Fourth, deployment costs can be reduced by limiting the size of the smart contracts deployed for each payment. This can be accomplished by deploying smart contracts that include references or links to bytecode included in other code sources (e.g., smart contract libraries, smart contract factories, off-chain locations, etc.). In other words, the smart contracts deployed for a transaction can include bytecode that is unique to the associated payment (or payment destination), but link to bytecode that is common across other transactions (or payment destinations).

3. System.

FIGS. 1A-1D show systems in accordance with embodiments. The system 100 includes at least a blockchain application system 190.

In some variations, the blockchain application system 190 functions to provide payment processing (for point-of-sale transactions or on-line sale transactions) using any suitable type of cryptocurrency assets.

Figure 9:
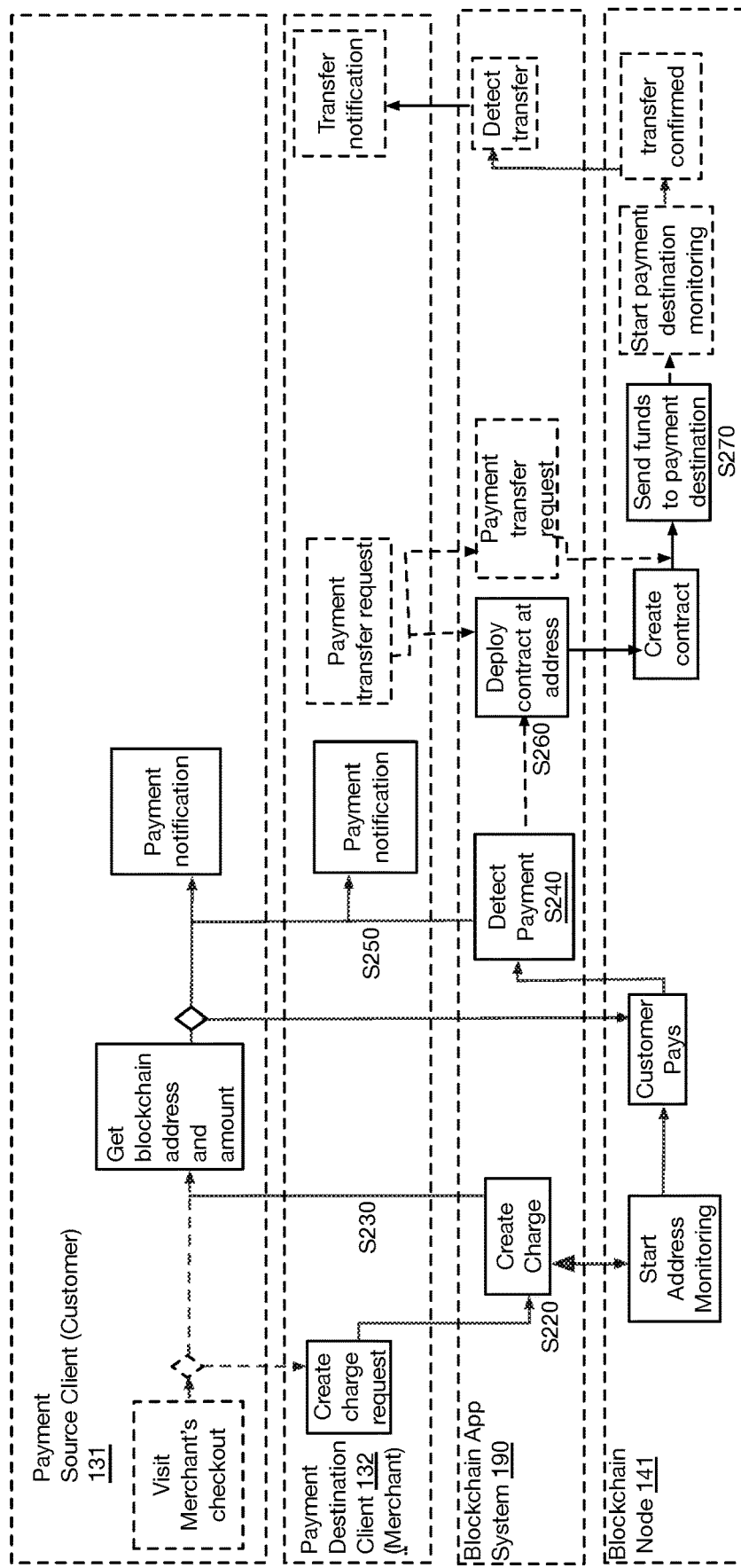
FIG. 9 is a schematic representations of example use cases for the system and method.

In a first example, the blockchain application system 190 provides on-line sale transaction processing (shown in FIG. 9). The blockchain application system 190 can process a payment request received from a payment source client (e.g., via a web browser running on the client), or from a payment destination client (e.g., a shopping cart web application interfacing with the web browser), and the blockchain application system 190 can provide a proxy blockchain destination (e.g., a proxy payment destination) to the payment source client (e.g., either directly, or via the shopping cart web application). The payment source client can then transfer cryptocurrency assets to the proxy blockchain destination to initiate payment.

In a second example, the blockchain application system 190 provides point-of-sale transaction processing (shown in FIG. 9). The blockchain application system 190 can process a payment request received from a point-of-sale (POS) terminal (e.g., located in a store, restaurant, etc.), and the blockchain application system 190 can provide a proxy blockchain destination (e.g., a proxy payment destination) to the POS terminal. The POS terminal can provide an identifier or the proxy blockchain destination to a payment source client used by a customer (e.g., by displaying a textual representation of a blockchain address, displaying a QR code that represents the blockchain address, wirelessly transmitting the blockchain address, etc.), and the payment source client can then transfer cryptocurrency assets to the proxy blockchain destination to initiate payment.

Cryptocurrency assets supported by the blockchain application system 190 can include one or more of: Ether (ETH), a token (e.g., an ERC20 token), a stable coin (e.g., USDC, DAI, etc.) and the like.

In some variations, the blockchain application system 190 is be a non-custodial payment processing system, in which payment recipients maintain ownership of assets being transferred as payment. In some variations, the blockchain application system 190 provides one or more hosted digital wallets (e.g., wallets used by entities making payments by using the blockchain application system 190, etc.).

The blockchain application system 190 can be a single-tenant system, a multi-tenant platform, or any suitable type of system. The blockchain application system 190 can be communicatively coupled to one or more client devices. The blockchain application system 190 can be a single-chain system that supports a single blockchain protocol, or a multi-chain system that supports one or more blockchains protocols (and therefore support one or more types of cryptocurrency assets that correspond to the supported blockchain protocols).

In some variations, the blockchain application system 190 includes an application programming interface (API) (e.g., a REST API, an HTTP-based API, etc.) for communicating directly with one or more client devices off-chain (e.g., via a public network, a private network, etc.). In some variations, the blockchain application system 190 includes an interface for communicating (directly, or indirectly) with one or more blockchain nodes (e.g., 141) (for one blockchain or a plurality of blockchains). Alternatively, the blockchain application system 190 can include at least one blockchain node (or function to perform operations of at least one blockchain node) for one or more types of blockchains.

The blockchain application system 190 functions to perform blockchain operations (e.g., read blockchain data, generate blockchain transaction, sign blockchain transaction, send signed blockchain transaction to a blockchain network, activate a smart contract method, etc.) for one or more blockchains (either directly, or by using a blockchain interface or blockchain node).

In some variations, the blockchain application system 190 includes an invoicer service that functions to manage invoices (e.g., generate invoice, send invoice, track payment of invoice, etc.) generated for payment requests received by the blockchain application system 190 from one or more client devices (e.g., via a user interface, an API of the blockchain application system 190, etc.).

Client devices (e.g., 131, 132) can include one or more of a mobile device, a computer, a server, a point of sale (POS) terminal, a wearable device, an embedded device an automated user device (e.g., a bot, a robot, a drone, an autonomous vehicle, etc.).

In a first example, a payment source client device (e.g. 131) can include a computing system that is communicatively coupled to one or more of a web application (e.g., a shopping cart application), the blockchain application system 190 (e.g., via a web browser or native application running on the computing system), and a blockchain network (either directly, or indirectly via a cloud-based wallet system or a cryptocurrency exchange system, etc.). A payment destination client device (e.g., 132) can include a computing device running one or more of the web application and a payment processing client application (e.g., a merchant or seller digital wallet application).

In a second example, a payment source client device (e.g., 131) can include a computing system that is proximate to a point of sale terminal, and that is communicatively coupled to a blockchain network. The payment source client device can include a camera for scanning QR codes, and one or more wireless interfaces for wireless communication with the point of sale terminal. The payment destination client device (e.g., 132) can be the point of sale terminal. In both the first and second examples, the payment destination client device (e.g., 132) can be communicatively coupled to the blockchain application system 190, and optionally communicatively coupled to the blockchain network (either directly, or indirectly via a cloud-based wallet system or a cryptocurrency exchange system, etc.).

Client devices (e.g., 131, 132) can be devices that function to perform at least one of the following on behalf of at least one user: performing blockchain operations (e.g., read blockchain data, generate blockchain transaction, sign blockchain transaction, send signed blockchain transaction to a blockchain network, activate a smart contract method, etc.), sending API requests to the blockchain application system 190 (e.g., via a user interface, an API of the blockchain application system 190, etc.), and processing API responses received from the application system 190. In some variations, a client device (e.g., 131, 132) includes at least one of a standard digital wallet, a client interface to a hosted digital wallet, and a blockchain interface that it uses to perform blockchain operations. Example blockchain interfaces include Web3, a custom interface that interfaces with one or more blockchains using a corresponding blockchain protocol, etc.

The blockchain node (e.g., 141) can include a copy of blockchain data (e.g., 152 shown in FIGS. 1C and 1D) used by a blockchain network, and the blockchain data can include data and/or machine executable instructions for one or more of a smart contract (e.g., 160b shown in FIG. 1B), a clone smart contract (e.g., 160a shown in FIG. 1A), a parent smart contract (e.g., 177a shown in FIG. 1A) that is a parent to a clone smart contract, a proxy blockchain destination (e.g., 161 shown in FIG. 1C) (e.g., a blockchain account, a blockchain address), a smart contract factory (e.g., 178), a smart contract library (e.g., 179, and a payment destination (e.g., 173). However, the blockchain node can include any suitable components.

Figure 1B:
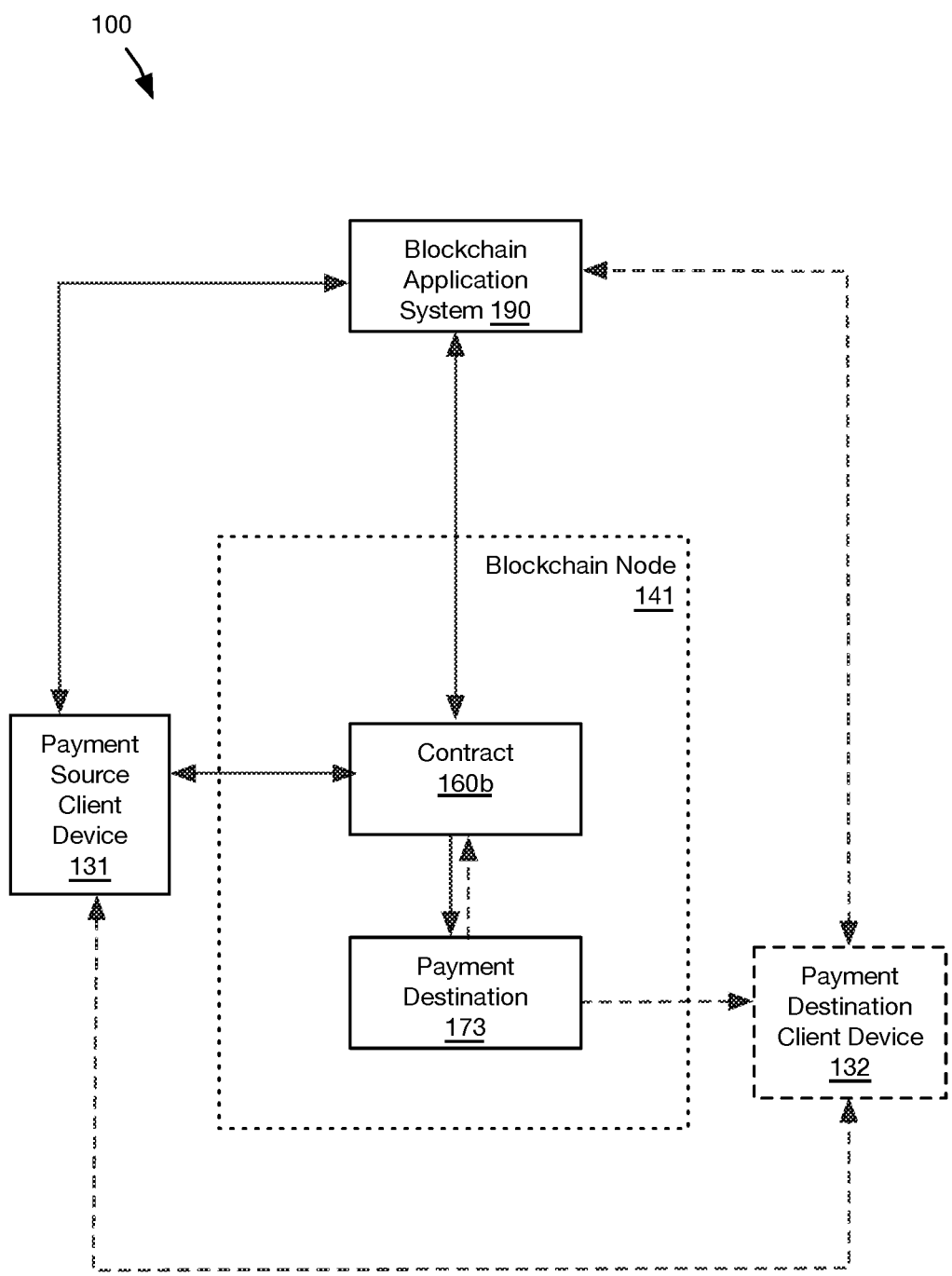
Figure 1C:
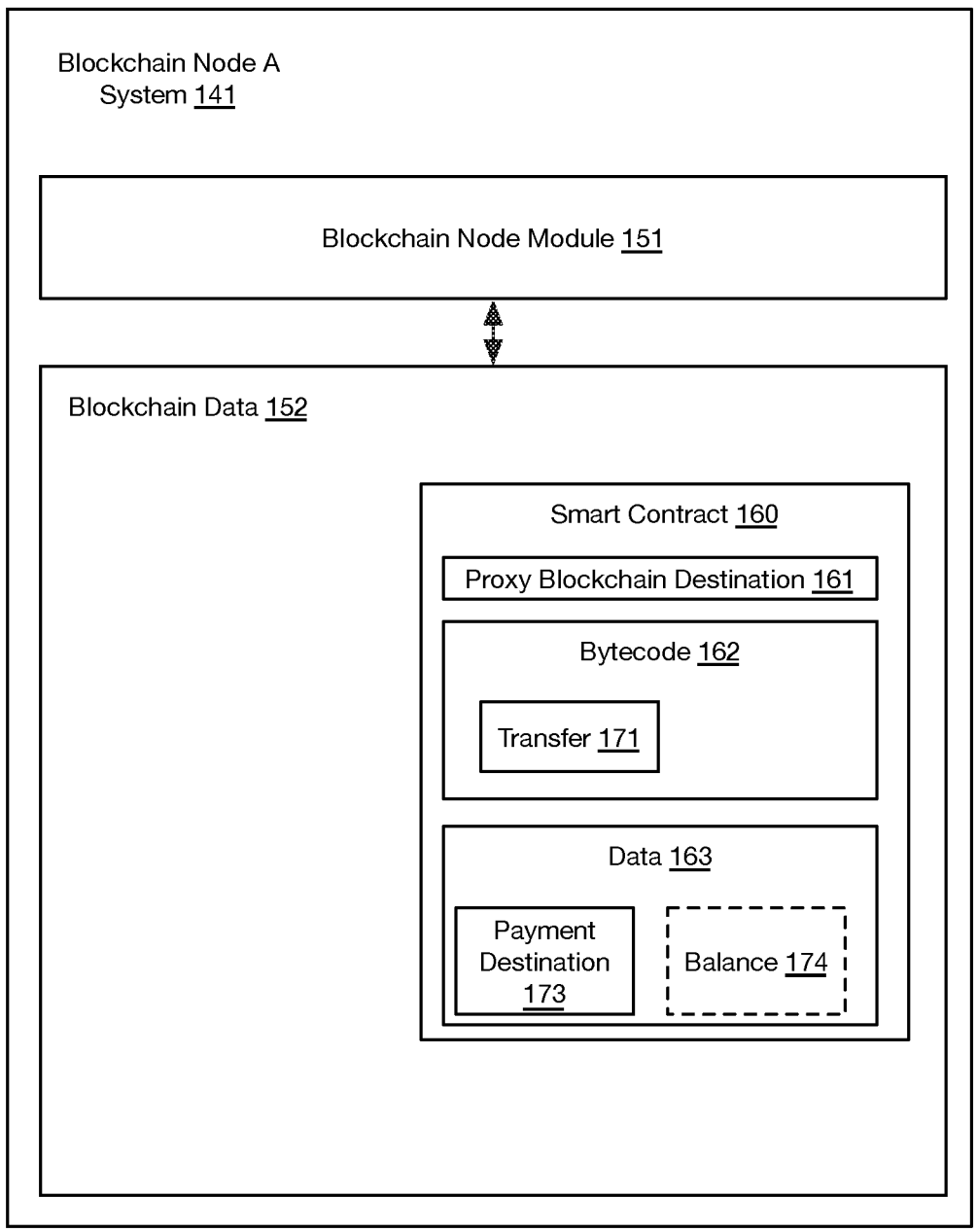
Figure 1D:
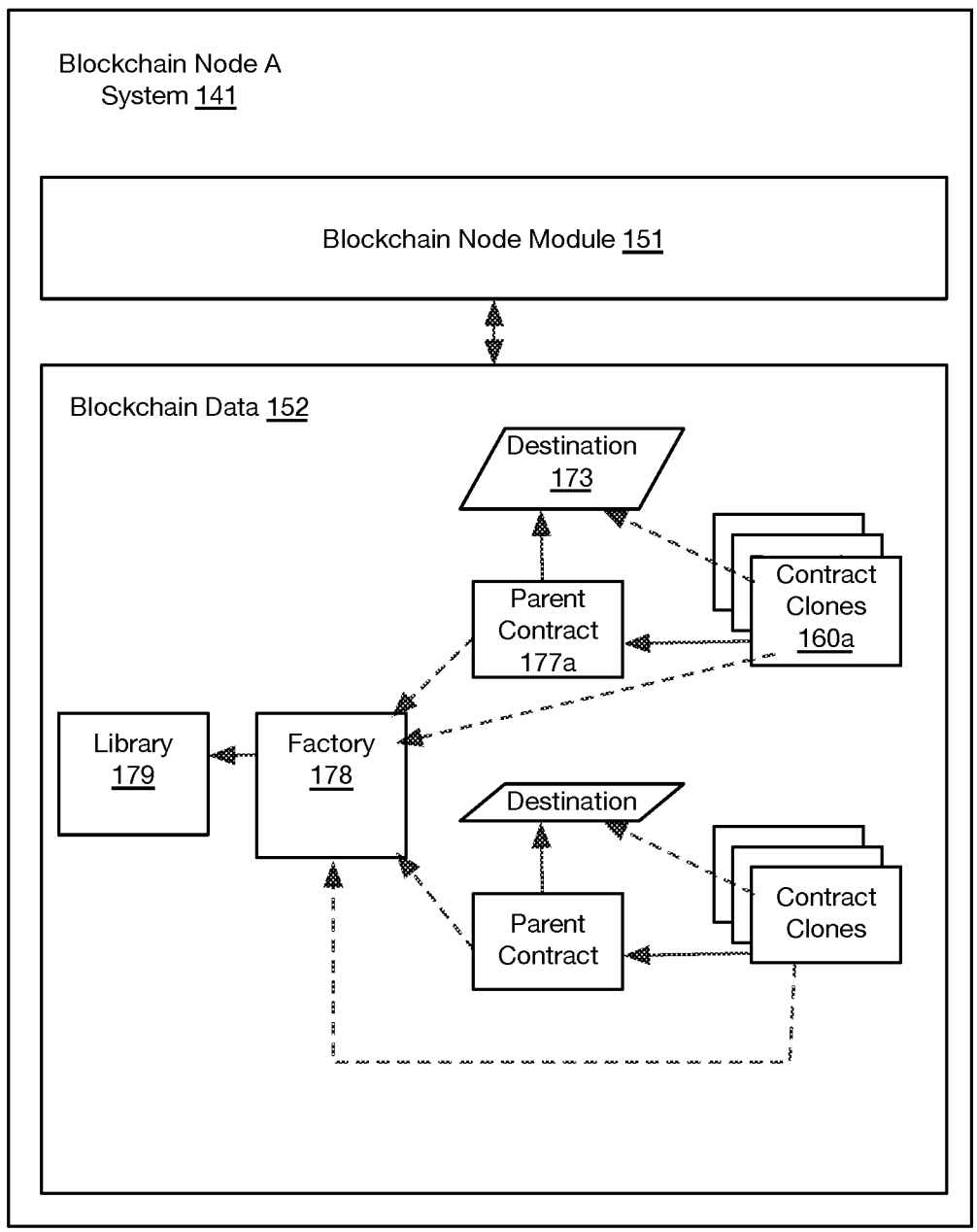

The blockchain node (e.g., 141) can include a blockchain node module (e.g., 151 shown in FIG. 1C) and blockchain data (e.g., 152 shown in FIG. 1C). The blockchain node module (e.g., 151) functions to perform operations of a blockchain node (e.g., smart contract execution, block generation, block validation, transaction validation, voting, staking, etc.), in accordance with at least one blockchain protocol.

The blockchain node module (e.g., 151) can be (or can include) a smart contract virtual machine (e.g., the Ethereum Virtual Machine (EVM)). In some implementations, the blockchain node module functions to execute Solidity smart contracts for the Ethereum blockchain. However, the blockchain node module can be (or include) any suitable type of virtual machine, or can be any suitable type of module.

Figure 2:
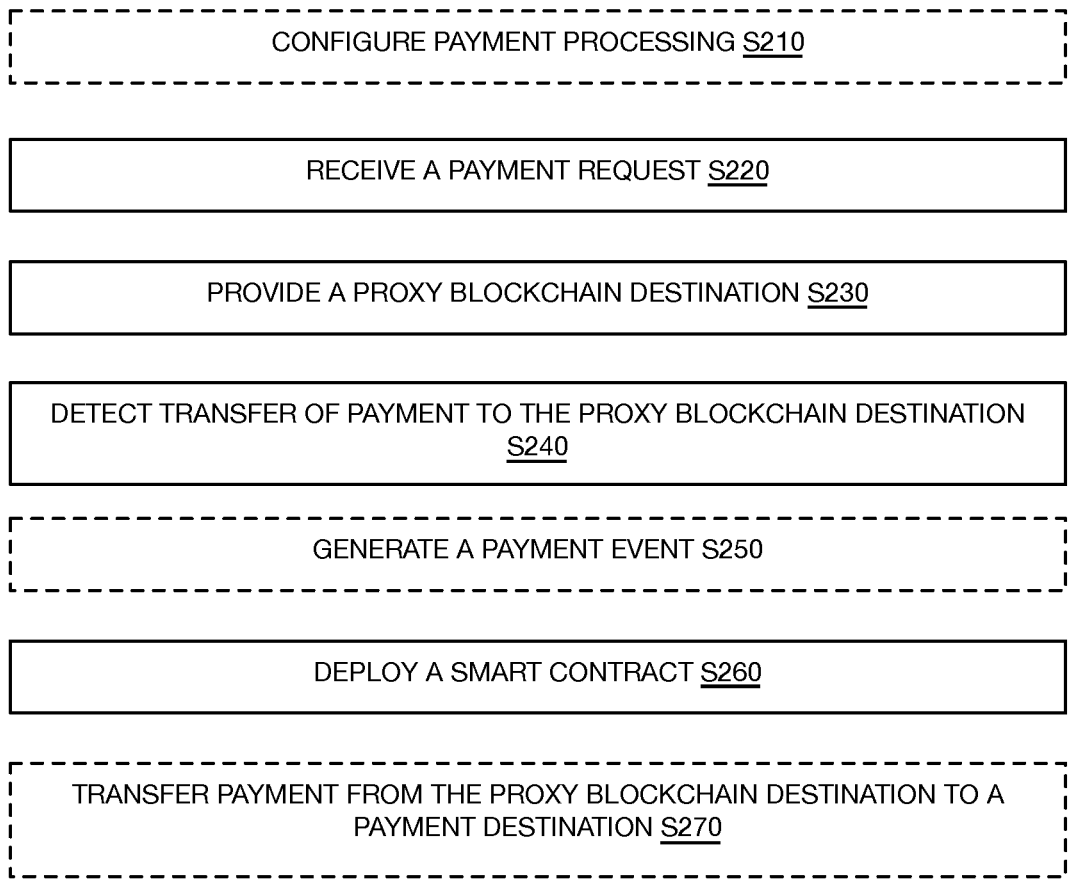
FIG. 2 is a representation of a method, in accordance with embodiments.
Figure 3:
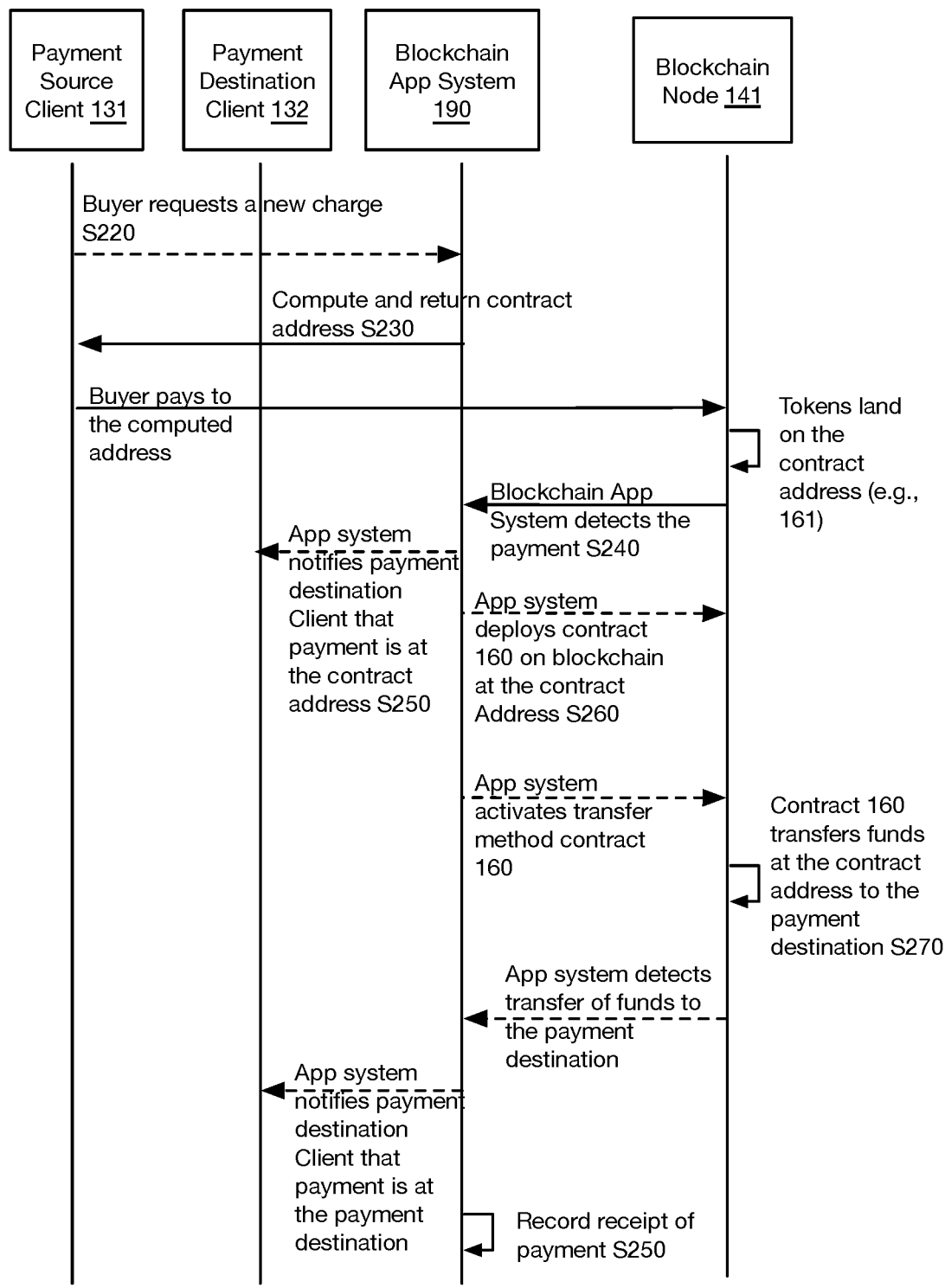
FIG. 3 is a representation of a variant of the method, in accordance with embodiments.
Figure 4:
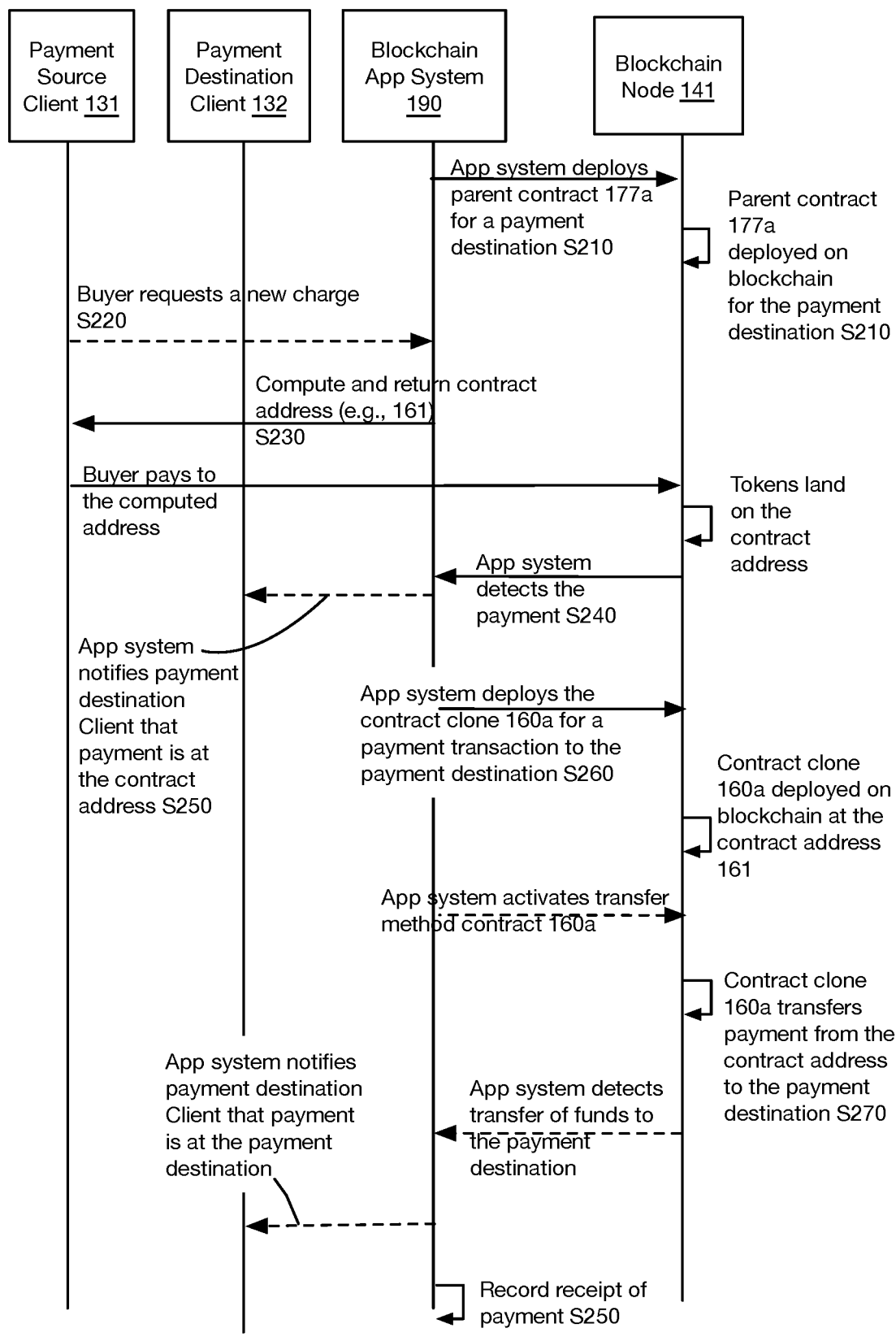
FIG. 4 is a representation of a variant of the method, in accordance with embodiments.

The blockchain data (e.g., 152) includes data recorded on the blockchain. In some variations, the blockchain data includes transaction data. In some variations, the blockchain data includes smart contract data for one or more smart contracts (e.g., a parent contract 177a, a contract clone 160a, a contract library 179, a contract factory 178, etc.). Smart contract data for a smart contract can identify a contract address (e.g., proxy blockchain destination 161 shown in FIG. 1C) (e.g., determined at S220 of the method shown in FIG. 2), smart contract bytecode (e.g., 162), and smart contract data (e.g., 163) accessible by the smart contract bytecode during execution of the smart contract. In some embodiments, the smart contract data 163 identifies the payment destination (e.g., 173), and optionally a balance of funds 174 held by the contract address 161 of the smart contract.

In some variations, the bytecode 162 of the smart contract includes bytecode for one or more methods (e.g., 171) that can be activated by anyone and/or be automatically executed. In some variations, the transfer method 171 functions to transfer assets held by the contract address 161 (proxy blockchain destination) to the payment destination 173. In some implementations, the smart contract self-destructs after completion of the transfer method 171. In some implementations, the blockchain network that includes the blockchain node 141 executes the transfer method 171 in response to recordation of a blockchain transaction for activation of the transfer method 171 (method activation blockchain transaction), and such blockchain transaction can be broadcast to the blockchain network by any suitable system.

At least one component of the system 100 is implemented as at least one hardware device that includes a bus that interfaces with processors, a main memory, a processor-readable storage medium, and a network interface device. In some variations, the bus interfaces with at least one of a display device and a user input device.

In some variations, at least one network interface device (e.g., a network interface included in the blockchain application system 190, etc.) of the system 100 is communicatively coupled to at least one other network interface device (e.g., of the payment source client, the payment destination client, the blockchain node, etc.) (indirectly or directly) via one of a public network (e.g., the Internet) or a private network.

In some variations, the processor-readable storage medium includes one or more of: a hard drive, optical drive, flash drive, non-volatile memory, volatile memory, and the like. In some variations, the processor-readable storage medium includes instructions for performing at least a portion of the method described herein.

At least one component of the system can perform at least a portion of the method.

4. Method.

FIGS. 2, 3, 4, 7, 9 and 10 are example representations of a method 200. The method can include at least one of: configuring payment processing S210; receiving a payment request S220; providing a proxy blockchain destination S230; detecting transfer of payment to the proxy blockchain destination S240; generating a payment event S250; deploying a smart contract S260; and transferring payment from the proxy blockchain destination to the payment destination S270.

At least one component of the system can perform at least a portion of the method. In some implementations, the blockchain application system 190 performs at least one of S210-S270.

The blockchain transaction fees (e.g., gas) to validate any of the transactions described herein (e.g., payments, smart contract generation, etc.) can be paid by: the transaction sender (e.g., payment source 131, blockchain application system 190, payment destination 132), the transaction recipient, the parent smart contract, the child smart contract (e.g., using child-pays-for-parent), and/or other payment system.

Configuring payment processing S210 can be performed in response to a request received via a user interface (e.g., a user interface provided the blockchain application system 190) or an API (e.g., an API included in the blockchain application system 190). In some variations, the blockchain application system 190 receives a payment processing configuration request from a client device (e.g., a payment destination client device 132, or another client device). In some variations, the payment processing configuration request identifies the payment destination (e.g., 173). The payment processing configuration request can be provided on behalf of a merchant or service provider that wishes to accept cryptocurrency in exchange for goods or services.

Configuring payment processing S210 can include one or more of: generating login credentials for the entity requesting payment processing configuration; generating a payment account identifier; deploying one or more generic smart contracts used for payment processing for any payment destination; deploying a parent smart contract (e.g., 177a shown in FIG. 1A, 177 shown in FIG. 1D) for a payment destination; and generating at least one payment API endpoint (e.g., a REST endpoint, a URL, an account identifier, etc.).

Generic smart contracts can include one or more of a smart contract library (e.g., 179 shown in FIGS. 1A and 1D) and a smart contract factory (e.g., 178). These generic smart contracts can include bytecode (e.g., bytecode for a transfer method 171) that can be executed by smart contracts deployed for a specific payment destination or a specific payment transaction. By deploying smart contracts that include bytecode for functionality that can be used by smart contracts for specific payment destinations or specific transactions, the size of smart contracts for specific payment destinations or transactions can be minimized, thereby reducing costs of deploying such smart contracts. Deployment of the one or more generic smart contracts for payment processing can be performed during initialization of the blockchain application system. In some embodiments, such generic smart contracts can be added, removed, reconfigured, and redeployed at any suitable to time to reduce deployment costs for smart contracts used for payment processing. However, such generic smart contracts can be deployed at any suitable time.

In some implementations, the parent smart contact references one or more generic smart contracts (e.g., a smart contract factory 178, a smart contract library 179, etc.) (either directly, or indirectly via a directly referenced smart contract) that includes bytecode (e.g., bytecode for a transfer method 171) that can be executed by the parent smart contract (or by a contract clone smart contract that references the parent smart contract). The parent smart contract can include (or reference) an identifier for the payment destination (e.g., 173). In a first variation, once deployed, the payment destination of the parent smart contract cannot be changed. In a second variation, once deployed, the payment destination of the parent smart contract can be re-configured (e.g., in response to activating of a configuration method that provides valid authentication credentials).

FIG. 6 shows exemplary code for methods of a parent smart contract (ForwarderFactory). As shown in FIG. 6, the parent smart contract (e.g., 177a) includes a method to initialize the parent smart contract ("initForwarder"), a method to deploy a contract clone ("cloneForwarder"), and a helper method ("createClone") that is referenced by method to deploy the contract clone. As shown in FIG. 6, the CREATE2 opcode is used by the helper method.

The payment API endpoint can be provided to the system requesting payment processing configuration as a response to the payment processing configuration request. In a first example, the payment API endpoint can be provided to a web application (e.g., as a URL) (e.g., a shopping cart application). In a second example, the payment API endpoint can be provided to a point of sale application running on a point of sale terminal.

Receiving a payment request S220 can include receiving a payment request via the payment API endpoint.

Figure 5:
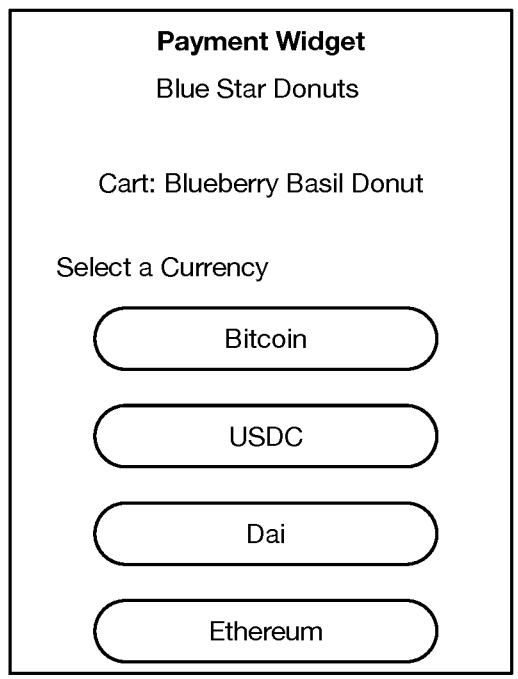
FIG. 5 is a representation of a user interface, in accordance with embodiments.
Figure 7:
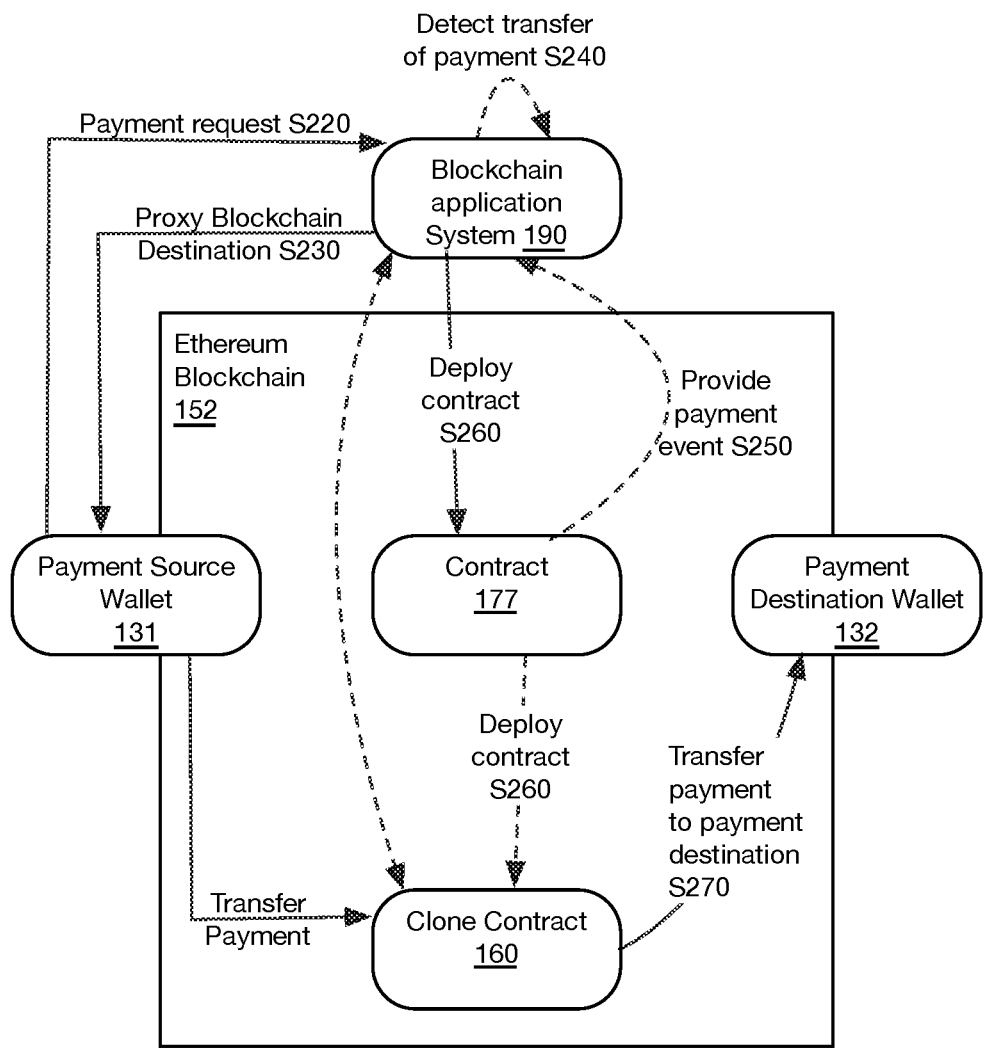
FIG. 7 is a representation of a method, in accordance with embodiments.

Receiving a payment request S220 can include receiving at the blockchain application system (e.g., 190) the payment request. The payment request can be received via a user interface (e.g., shown in FIG. 5), received via an API, generated by the blockchain application system, or otherwise received. The user interface can be a user interface presented by an application (e.g., a web browser, a native application). The application can be a POS terminal application, a digital wallet application, a commerce account application, etc. The application can be a client that interfaces with a server application (e.g., an application server, a web server, a hosted digital wallet, a commerce platform, a hosted cryptocurrency exchange system, etc.). The application can he executed by any suitable client device. Alternatively, the blockchain application system can receive payment requests via an API of the blockchain application system 190 (e.g., from an application server, a web server, a hosted digital wallet, a commerce platform, a hosted cryptocurrency exchange system, etc.).

The payment request can be received from a payment source client device, a payment destination client device, a point of sale terminal, an application server, or any suitable system or system component.

The payment request can include payment information. In some variations, information included in the payment request includes one or more of: payment source digital wallet address; purchase information (e.g., an identification of goods and/or services purchased, and optionally other related purchase information, etc.); a merchant identifier; a seller identifier; an invoice identifier; an invoice; an identifier of a payment method; and any other suitable information. The identifier of the payment method can include one or more of: an identifier, a wallet address, and a smart contract address (e.g., an address of a smart contract used to transfer cryptocurrency tokens) of the cryptocurrency asset used for payment.

In some variations, additional payment information is generated (e.g., by the blockchain application system 190) in response to processing the payment request. Payment information generated in response to processing the payment request can include one or more of: a payment destination; an invoice (or invoice identifier or link) (e.g., signed by a private key of the blockchain application system or an invoicer service); a payment amount; a fee amount; a smart contract address (e.g., an address of a smart contract used to transfer cryptocurrency tokens) of the cryptocurrency asset used for payment; and an expiration timestamp.

However, payment information included in the payment request or generated in response to processing the payment request can include any suitable information.

In some variations, invoices are generated in connection with payment requests. In a first variation, the blockchain application system 190 generates invoices for received payment requests (e.g., by using an invoicer service, etc.), and optionally provides the generated invoice to one or more systems (e.g., the system providing the payment request, a smart contract, a parent contract, a contract clone, etc.). In a second variation, the system providing the payment request generates the invoice for the payment request, and can include the invoice (or an invoice identifier for the invoice) in the payment request. In some implementations, the invoice is signed by a private key of the system that generates the invoice.

Providing a proxy blockchain destination S230 can include providing the proxy destination to a client device (e.g., a web application, a point of sale terminal, a native application running on a customer device, a browser application running on the customer device, etc.) (e.g., the client device providing the payment request, etc.).

Providing a proxy blockchain destination S230 can be performed in response to receiving a payment request at S220.

The response to the payment request can be provided to the client device providing the payment request. Additionally, or alternatively, the response to the payment request can be provided to a system that does not provide the payment request.

The response to the payment request can include one or more of: the proxy blockchain destination; a payment destination; an invoice (or invoice identifier or link) (e.g., signed by a private key of the blockchain application system or an invoicer service); a payment amount; a fee amount; a smart contract address (e.g., an address of a smart contract used to transfer cryptocurrency tokens) of the cryptocurrency asset used for payment; and an expiration timestamp. However, the response to the payment request can include any suitable information.

In some variations, the payment destination (or other payment information) can be: calculated by the smart contract (e.g., received in the smart contract deployment request), included as smart contract data (e.g., 163), stored by an off-chain database (e.g., wherein the smart contract includes a reference or pointer to the database), or otherwise identified. In a first variation, the payment destination 173 is a blockchain destination of the blockchain managed by the blockchain node 141. However, in other variations, the payment destination 173 can be a blockchain destination of any suitable blockchain (e.g., a blockchain managed by the blockchain node 141, a blockchain that is different from the blockchain managed by the node 141). In a first example, a blockchain can record the bytecode of smart contracts used by the blockchain application system 190, and also record transactions that transfer assets to (or from) the payment destination. In a second example, a first blockchain can record the bytecode of smart contracts used by the blockchain application system 190, and a second blockchain can record transactions that transfer assets to (or from) the payment destination. In this second example, smart contracts recorded on a first blockchain (e.g., Ethereum) can be used to process payment using cryptocurrency assets managed by a second blockchain that is unrelated to the first blockchain used for the smart contracts. The payment destination can be: an address associated with the smart contract address (e.g., generated from the same private key or key hierarchy), an address associated with the blockchain application system (e.g., a platform address, a user address managed by the platform, etc.), an off-platform address (e.g., user-managed address wherein the user holds the private key), and/or any other suitable payment destination. The payment destination can belong to the payee entity (e.g., merchant, seller), a payor entity (e.g., customer, payment source) (e.g., when a refund is to be issued), and/or other entity. Payment destination ownership can be determined by custodianship (e.g., ownership) of the private key associated with the payment destination (e.g., private key that the payment destination was generated from); entitlement (e.g., contractual entitlement); or otherwise determined. The payment destination's private key can be held: by the payee (e.g., the merchant, off-platform), by the blockchain application system 190, or by another system.

The proxy blockchain destination can be a blockchain destination (e.g., a blockchain account, a blockchain address, etc.) of a smart contract, or a blockchain destination controlled by the smart contract (e.g., by using one or more of a private key, a security token, authentication credentials, etc.). The proxy blockchain destination can be used to receive payment from the payment source, such that the payment destination is not directly exposed to the payment source, and such that the amount of funds owned by (e.g., transferable to) the payment destination is obfuscated. The proxy blockchain destination is preferably not related to the payment destination (e.g., is generated using a different master seed, if a hierarchical deterministic wallet is used; funds cannot be transferred in response to validation of a transaction signed by the payment destination's private key), but can alternatively be related (e.g., be a parent or child address of the payment destination).

Providing a proxy blockchain destination S230 can include determining the proxy blockchain destination.

In some variations, the proxy blockchain destination is a blockchain destination of a smart contract. The smart contract can be one or more of: a currently deployed unused smart contract (e.g., a smart contract that has not yet been used for payment transaction processing); a currently deployed previously used smart contract; a smart contract that has not yet been used or deployed; a smart contract that was previously deployed and used, but is no longer currently deployed (e.g., self-destructed); and/or have any other suitable state. In some variations, the blockchain application system 190 deploys a pool of smart contracts, and uses the addresses of the deployed smart contracts as the new proxy blockchain destinations. Alternatively, the smart contract is a smart contract that has not been deployed, but that will be deployed and used to transfer cryptocurrency assets to the payment destination configured at S210. Alternatively, the proxy blockchain destination can not be associated with a smart contract.

In a first variation, proxy blockchain destinations are not reused, and a new proxy blockchain destination is generated for each transaction. In a second variation, proxy blockchain destinations can be reused (e.g., if the destination has not been used for a predetermined period of time, or in response to satisfaction of any suitable rule). In a first example, proxy blockchain destinations previously generated for a given payment destination can be reused for the same payment destination. In a second example, proxy blockchain destinations previously generated for a given entity (e.g., merchant, seller) can be reused for the same entity. In a third example, a proxy blockchain destinations previously generated for any entity or payment destination can be reused for any entity or payment destination. However, proxy blockchain destinations can otherwise be reused.

In some variations, the proxy blockchain destination is be generated based on one or more of: a salt (or nonce), and code of a smart contract (e.g., 160) that will be (or is) deployed. In some variations, the blockchain application system 190 generates a salt for the payment request received at S220. The salt can be randomly generated, deterministically generated (e.g., based on payment information associated with the payment request), incremented serially, or otherwise generated. In some variations, the blockchain application system 190 accesses the code (e.g., bytecode) of the smart contract (e.g., 160) that will be (or is) deployed on the blockchain.

In some variations, the blockchain application system 190 generates the proxy blockchain destination (e.g., 161). Alternatively, the proxy blockchain destination can be generated by a smart contract (e.g., wherein the proxy blockchain destination can be sent to the blockchain application platform 190 for tracking), generated by the payment destination client 132, or otherwise generated.

In some implementations, the proxy blockchain destination is generated by performing content-addressing using the accessed bytecode (or a hash of the accessed bytecode), and optionally the salt. In some implementations, the proxy blockchain destination is generated by using the CREATE2 Ethereum opcode; the accessed bytecode (or a hash of the accessed bytecode), and optionally the salt, are passed as the bytecode and salt parameters for the CREATE2 Ethereum opcode. In some implementations, the CREATE2 Ethereum opcode is used to deploy the smart contract at S260. In some implementations in which the proxy blockchain destination is generated based on the combination of the bytecode and the salt, a new proxy blockchain destination can be generated by changing the salt without modifying the bytecode. In some implementations, the salt is associated with one payment request. In some implementations, the salt is associated with two or more payment requests. The salt is preferably unique for the payment destination across different payment requests and/or proxy blockchain destinations, but can additionally or alternatively be reused (e.g., after a predetermined time period, predetermined number of blocks, etc.).

In some variations, the proxy blockchain destination is generated based on at least a portion of the payment information (included in the payment request or generated by the blockchain application system 190 in response to the payment request). In some implementations, the smart contract bytecode includes bytecode that identifies the payment information, and the proxy blockchain destination is generated based on the smart contract's bytecode (e.g., by performing content-addressing on the bytecode). Thus, the proxy blockchain destination is dependent on the bytecode that represents the payment information, such that a change in the bytecode that represents the payment information results in a change in the generated proxy blockchain destination.

In some implementations, the payment information is used to generate a salt, and the salt is used to generate the proxy blockchain destination. In some implementations, if the payment information (e.g., the payment destination) changes, the salt changes, and thus the proxy blockchain destination changes as well.

Generation of a proxy blockchain destination is useful for invoicing. By generating a proxy blockchain destination (e.g., 161) for each payment request (e.g., charge, invoice, etc.), funds paid to the proxy blockchain destination can be linked to a particular payment request by matching the proxy blockchain destination to a stored invoice (e.g., wherein the invoice is stored in association with the proxy blockchain destination by the blockchain application system 190). By generating a proxy blockchain destination for each payment request (e.g., charge, invoice, etc.), funds paid to a proxy blockchain destination can be linked to a particular payment source by matching the proxy blockchain destination to the stored invoice. In this manner, any payment received at the proxy blockchain destination (e.g., 161) can be linked back to the invoice, payment request, and/or payment source (e.g., 131).

In some variations, the blockchain application system 190 stores the proxy blockchain destination in association with the payment information identified at S220. In this manner, the blockchain application system 190 can use the proxy blockchain destination to retrieve the stored payment information associated with the proxy blockchain destination. Similarly, the blockchain application system 190 can use at least a portion of the payment information to retrieve the stored proxy blockchain destination associated with the payment information.

Detecting transfer of payment to the proxy blockchain destination S240 functions to detect payment to the proxy blockchain destination. Detecting transfer of payment can be performed by the blockchain application system 190, a smart contract (e.g., a parent contract 177a, a smart contract factory 178, etc.), or any other suitable component.

In some variations, the payment source client device (e.g., 131) assembles and signs a proxy payment transaction for transferring the funds to the proxy blockchain destination (e.g., 161 shown in FIG. 1C), and submits the signed transaction to the blockchain managed by the blockchain node (e.g., 141).

In some variations, the proxy payment transaction identifies one or more of: the proxy blockchain destination; a payment destination; an invoice (or invoice identifier or link) (e.g., signed by a private key of the blockchain application system 190); a payment amount; a fee amount; a smart contract address (e.g., an address of a smart contract used to transfer cryptocurrency tokens) of the cryptocurrency asset used for payment; and an expiration timestamp. However, the proxy payment transaction can identify any suitable information.

The proxy payment transaction can identify the appropriate amount of Ether value or perform a required token transfer (e.g., by activating a smart contract method for token transfer). In some variations, the proxy payment transaction identifies the payment destination (e.g., 173). Alternatively, the proxy payment transaction does not identify the payment destination (e.g., 173), and instead, a smart contract associated with the proxy blockchain destination identifies the payment destination.

In some variations, detecting transfer of payment S240 includes monitoring the blockchain node (e.g., 141) to detect payment to the proxy blockchain destination (e.g., by identifying the proxy payment transaction on the blockchain). In some variations, detecting transfer of payment S240 includes monitoring for updates to the proxy blockchain destination. If not enough payment is made, the system or module performing the monitoring (e.g., the blockchain application system 190, a deployed smart contract, etc.) waits for further payment. If sufficient payment or overpayment was made, then a smart contract can be deployed (e.g., by the blockchain application system 190, a deployed smart contract, etc.) for the proxy blockchain destination at S260.

In some variations, the blockchain application system 190 performs the monitoring and determines if sufficient payment or overpayment was made, by referencing payment information (e.g., a payment amount) associated with the payment request received at S220. Additionally or alternatively, a deployed smart contract (e.g., a parent contract, etc.) performs the monitoring and determines if sufficient payment or overpayment was made, by using payment information (e.g., a payment amount) received from the blockchain application system 190 (e.g., via a blockchain transaction, oracle contract, off-chain interface, etc.). However, determination of sufficient payment or overpayment can be otherwise performed by any suitable systems or modules, and at any suitable time.

In some variations, a non-fungible token (NFT) is transferred to a digital wallet (e.g., by using one or more of the blockchain application system 190 and a deployed smart contract, etc.) associated with the payment source client (or a user of the payment source client) (e.g., 131) in response to detection that sufficient payment or overpayment was made to the proxy blockchain destination (at S240). In some implementations, one or more of the blockchain application system 190 and a deployed smart contract identify whether the proxy blockchain destination is related to a payment transaction for an NFT (e.g., by accessing the payment information associated with the proxy payment destination); if so, one or more of the blockchain application system 190 and a deployed smart contract initiates transfer of the NFT to the digital wallet associated with the payment source client (or a user of the payment source client) (e.g., 131).

Generating a payment event can S250 can include one or more of generating a payment event notification, recording a payment event log entry, and recording receipt of payment for the payment request. Generating a payment event can S250 can be performed responsive to detecting payment (sufficient payment, overpayment, etc.) to the proxy blockchain destination. Generating a payment event can S250 can include linking payment received at the proxy blockchain destination to a particular payment request (or invoice related to the payment request).

In some variations, at least one system or module performing the monitoring at S240 can generate the payment event, and optionally record an associated payment event log entry, or send a payment event notification to any suitable system or module. The payment event notification (or payment event log entry) can include one or more of: an invoice identifier, a payment source identifier, a payment destination identifier, and/or any other suitable information. In implementations in which the proxy blockchain destination is associated with an invoice, the payment event can indicate that the invoice has been paid. In variants, a system receiving the payment event notification can associate the payment event notification with an invoice, and perform any associated actions (e.g., transferring title, initiating delivery, sending confirmation a payment destination client device, etc.).

In a first example, the blockchain application system 190 performs the monitoring (at S240) and detects (at S240) that sufficient or overpayment was made to the proxy blockchain destination. The blockchain application system 190 can record (at S250) a log entry for the payment event related to the payment to the proxy blockchain destination. Additionally or alternatively, the blockchain application system 190 can send (at S250) the payment event to another system (e.g., a point of sale terminal, a customer user device, a merchant user device, a hosted shopping cart application, a client of a hosted shopping cart application, or any other suitable system). In a second example, a deployed smart contract performs the monitoring (at S240) and detects (at S240) that sufficient or overpayment was made to the proxy blockchain destination, and the smart contract can send (at S250) the payment event to the blockchain application system 190 (or to another deployed smart contract), which can optionally forward the payment event notification (or a notification derived from the payment event notification) to another system. However, payment events can otherwise be generated and communicated.

The payment event notification can be sent to a system related to the payment destination (e.g., the payment destination client device, a shopping application server, a POS terminal, etc.). In a first example, the payment relates to a point of sale payment transaction performed by using a POS terminal, and the payment event notification is sent (e.g., by the blockchain application system 190, a deployed smart contract, etc.) to the POS terminal. Upon receiving the payment event notification, the POS terminal can display a user interface that notifies a user (e.g., a customer, a merchant) that payment has been received from the customer. In a second example, the payment notification is sent to a user device of a customer performing a purchase transaction via a POS terminal at a merchant's location. In a third example, the payment relates to an on-line payment transaction performed using a hosted shopping cart application, and the payment event notification is sent (e.g., by the blockchain application system 190, a deployed smart contract, etc.) to one of the shopping cart application and a client application that is in communication with the shopping cart application (e.g., an application running in a web browser). For example, the shopping cart application can be a web application that receives the payment notification, and displays a payment received user interface element in the shopping cart web site to inform a user (viewing the shopping cart client interface in their web browser) that payment has been received and that they can safely close their web browser session.

Deploying a smart contract S260 can include deploying a smart contract that functions to transfer assets from the proxy blockchain destination to a payment destination. The smart contract is preferably deployed at the proxy blockchain destination, but can be deployed at any other suitable blockchain destination. The smart contract is preferably controlled by (e.g., responsive to transactions signed by) the blockchain application system 190, but can additionally or alternatively be controlled by the payee entity (e.g., payment destination client) or another entity.

The smart contract is preferably configured to send (e.g., forward) assets to the payment destination. In a first variation, the payment destination is included in one or more of the bytecode (e.g., 162) and the data (e.g., 163) of the smart contract. In a second variation, the payment destination is included in the proxy blockchain transaction that transfers the payment to the proxy blockchain destination. However, the proxy blockchain destination can be otherwise specified for the smart contract.

The smart contract can be deployed at any suitable time, and in response to any suitable trigger. In a first variation, the smart contract is deployed before receiving a payment request (e.g., during configuration of payment processing at S210). In a second variation, the smart contract is deployed in response to a received payment request (e.g., at S220 or S230, in response to proxy blockchain destination determination, etc.). In a third variation, the smart contract is deployed in response to detecting transfer of payment to the proxy blockchain destination at S240 (e.g., on-chain validation of a transaction sending payment to the proxy blockchain destination). In a fourth variation, the smart contract is deployed in response to receiving a request to transfer payment from the proxy blockchain destination to the payment destination (at S270). In a fifth variation, the smart contract is deployed in response to detecting (on the blockchain on which the smart contract is to be deployed) a method activation blockchain transaction that identifies a method of the smart contract. However, the smart contract can otherwise be deployed.

The smart contract can be deployed directly, indirectly by using a parent smart contract, or otherwise deployed.

In a first variation, the blockchain application platform 190 deploys the smart contract (e.g., 160b shown in FIG. 1B) directly (e.g., by broadcasting a blockchain transaction that identifies the CREATE2 Ethereum opcode, etc.) (e.g., as shown in FIG. 1B). In some implementations, the blockchain application platform 190 provides at least a portion of the payment information for the payment request to the deployed smart contract (e.g., by generating, signing, and broadcasting to the blockchain network a method activation blockchain transaction that identifies the portion of the payment information). The smart contract can use the payment information to determine whether a payment received at the proxy blockchain destination matches a payment amount related to the payment request. However, the payment information can be otherwise used by the smart contract.

In a second variation, the blockchain application platform 190 deploys the smart contract (e.g., 160*a* shown in FIG. 1A) indirectly (e.g., as shown in FIG. 1A) by activating a smart contract method of a parent contract (e.g., 177*a* shown in FIG. 1A, 177 shown in FIG. 1D) that causes the parent contract to deploy the smart contract (e.g., 160*a*) directly (e.g., by broadcasting a blockchain transaction that identifies the CREATE2 Ethereum opcode, etc.). In some implementations, the blockchain application platform 190 provides at least a portion of the payment information for the payment request directly to the deployed smart contract (e.g., 160*a*) (e.g., by generating, signing, and broadcasting to the blockchain network a method activation blockchain transaction that identifies a method of the deployed smart contract and the portion of the payment information). Alternatively, the blockchain application platform 190 provides at least a portion of the payment information for the payment request to the deployed smart contract indirectly via the parent contract. The blockchain application platform 190 can generate, sign, and broadcast to the blockchain network a method activation blockchain transaction that identifies a method of the parent smart contract and the portion of the payment information. In turn, the parent smart contract can generate, sign, and/or broadcast to the blockchain network a method activation blockchain transaction that identifies a method of the deployed smart contract and the portion of the payment information. In this variation, the parent contract can be: specific to the payee (e.g., specific to a payment destination); generic (e.g., capable of cloning child contracts for a plurality of payees, wherein the respective payment destination can be provided by the blockchain application system 190 when calling the contract cloning function); or otherwise related to the payment destinations.

The blockchain application platform 190 can deploy: consecutive contracts with consecutive proxy blockchain destinations (e.g., when using CREATE); nonconsecutive contracts with nonconsecutive proxy blockchain destinations (e.g., when using CREATE2); or any other suitable set of contracts. The latter (e.g., nonconsecutive proxy blockchain destinations) can enable fee savings, since unused proxy blockchain destinations (e.g., destinations that never received payment) can be skipped over.

However, the smart contract can be otherwise deployed, and payment information can otherwise be provided to the deployed smart contract.

Transferring payment from the blockchain destination to the payment destination S270 can occur at any suitable time, and in response to any suitable trigger. In some variations, the smart contract performs the transfer of payment to the payment destination.

The smart contract can perform transfer of payment from the proxy blockchain destination to the payment destination in response to a trigger. In some variations, any system can send a request to the smart contract to transfer the payment to the payment destination, and reception of this request by the smart contract, and processing of this request cannot be prevented by other external systems (e.g., such as an exchange, hosted wallet platform, etc.). In some variations, the smart contract can transfer a portion of the payment to a processing fee destination that collects a processing fee charged for use of the system to process payments.

The payment is transferred by the smart contract (e.g., 160*a*, 160*b*) in response to any suitable trigger. Examples of triggers include: activation of a method of the smart contract, after a predetermined time period has expired, a balance of the blockchain address exceeding a threshold, detection of transfer of funds to the blockchain address, satisfaction of a rule, validation of a payment transfer request (e.g., signed by the blockchain application system 190, the payment destination private key, etc.), receipt of a withdrawal request (and/or withdrawal request creation), and/or other trigger. The triggers can be monitored by the smart contract, the blockchain application system 190, the payment destination client 132, or otherwise monitored and/or executed by another monitoring system. The monitoring system can optionally initiate payment transfer. For example, the monitoring system can generate, sign, and broadcast (or broadcast a pre-signed) transaction calling the smart contract's payment transfer function to the blockchain in response to trigger detection.

In some variations, a trigger includes detection of sufficient payment to the proxy blockchain destination.

In some variations, a trigger includes activation of the smart contract's transfer method. Upon activation of the smart contract's transfer method, the smart contract performs the transfer. The smart contract's transfer method can be activated by broadcasting a transfer method activation blockchain transaction that identifies the smart contract's transfer method. Any system (or combination of one or more systems) can generate, sign, and broadcast (to the blockchain network) the transfer method activation blockchain transaction. In a first example, the payment destination client device 132 generates, signs (e.g., by using a private key of the payment destination client device 132), and broadcasts the transfer method activation blockchain transaction in response to any suitable trigger (e.g., user input received via a user input device, satisfaction of conditions for a rule, etc.). In a second example, the blockchain application system 190 generates, signs, and broadcasts the transfer method activation blockchain transaction in response to any suitable event or trigger. In some implementations, triggers can include automatic rules, transfer requests (e.g., received from the payment destination client device, the payment source client device, a POS terminal system, an application server running a shopping cart application, or any other suitable device), and the like. In some implementations, the blockchain application system 190 receives a transfer request (e.g., via a user interface, an API of the application system 190, etc.), and in response, the blockchain application system 190 generates, signs (e.g., by using a private key of the blockchain application system 190), and broadcasts a signed blockchain transaction to activate the transfer method of the smart contract, controlling the smart contract to perform the transfer.

However, transfer of payment by the smart contract (e.g., 160*a*, 160*b*) can be otherwise triggered.

In some variations, the smart contract (e.g., 160*a*, 160*b*) self-destructs after performing the transfer of payment to the payment destination.

Transferring payment S270 can include determining if sufficient payment or overpayment was made to the proxy blockchain destination. In a first variation, the blockchain application system 190 determines if sufficient payment or overpayment was made at S270, by monitoring the blockchain and referencing payment information (e.g., a payment amount) associated with the payment request received at S220. Additionally or alternatively, a deployed smart contract (e.g., a parent contract, contract clone, etc.) performs the monitoring and determines if sufficient payment or overpayment was made, by using payment information (e.g., a payment amount) received from the blockchain application system 190 (e.g., via a blockchain transaction, oracle contract, off-chain interface, etc.). Additionally or alternatively, the smart contract (e.g., contract clone, etc.) deployed at S260 performs the monitoring and determines if sufficient payment or overpayment was made, by using payment information (e.g., a payment amount) received from the blockchain application system 190 (e.g., via a blockchain transaction, oracle contract, off-chain interface, etc.). In some implementations, at least a portion of the information associated with the payment request is added to the smart contract when the proxy blockchain destination is generated at S230. However, determination of sufficient payment or overpayment can be otherwise performed by any suitable systems or modules.

In some variations, if sufficient payment or overpayment was made to the proxy blockchain destination, then the smart contract (e.g., 160a, 160b) sends a payment event notification to the blockchain application system 190. The payment event notification can be similar to the payment event notification described herein with respect to generating a payment event at S250, can include any suitable type of information, and can be provided to any suitable system (e.g., a hosted shopping cart system, a POS terminal, a merchant device, etc.) and used to perform any suitable action (e.g., recording an invoice as paid, transferring title, initiating delivery, sending confirmation a payment destination client device, etc.).

In some variations, if overpayment was made, the smart contract (e.g., 160a, 160b) generates, signs and broadcasts a blockchain transaction to transfer the overpayment back to the digital wallet of the payment source (e.g., a digital wallet associated with the client device 131, or a user of the client device 131).

In some implementations, overpayment is transferred back to the digital wallet of the payment source automatically after transferring payment to the payment destination. In some implementations, overpayment is transferred back to the digital wallet of the payment source in response to receipt of a transaction signed by a private key of the payment destination client device. In some implementations, overpayment is transferred back to the digital wallet of the payment source in response to receipt of a transaction signed by a private key of the payment source client device. However, overpayment can otherwise be transferred back to the digital wallet of the payment source.

In some variations, transferring payment to the payment destination S270 includes transferring a non-fungible token (NFT) to a digital wallet associated with the payment source client (or a user of the payment source client) (e.g., 131), as described herein in relation to S240.

The method can optionally include one or more of: performing payment destination monitoring (e.g., by using the smart contract, the blockchain application system 190, or any other suitable system or module), detecting confirmation of the transfer to the payment destination (e.g., by using the smart contract, the blockchain application system 190, or any other suitable system or module), and providing a transfer notification (e.g., by using the smart contract, the blockchain application system 190, or any other suitable system or module) (e.g., as shown in FIG. 9). The transfer notification can be provided to the payment destination client (e.g., 132), or any suitable system or module. The transfer notification can be provided in response to any suitable event or trigger. In a first example, the transfer notification is provided in response to transferring payment to the payment destination at S270. In a second example, the transfer notification is provided in response to detecting a recorded blockchain transaction that transfers the payment to the payment destination (e.g., regardless of whether the transaction is confirmed). In a third example, the transfer notification is provided in response to detecting confirmation of the transfer to the payment destination.

Figure 8A:
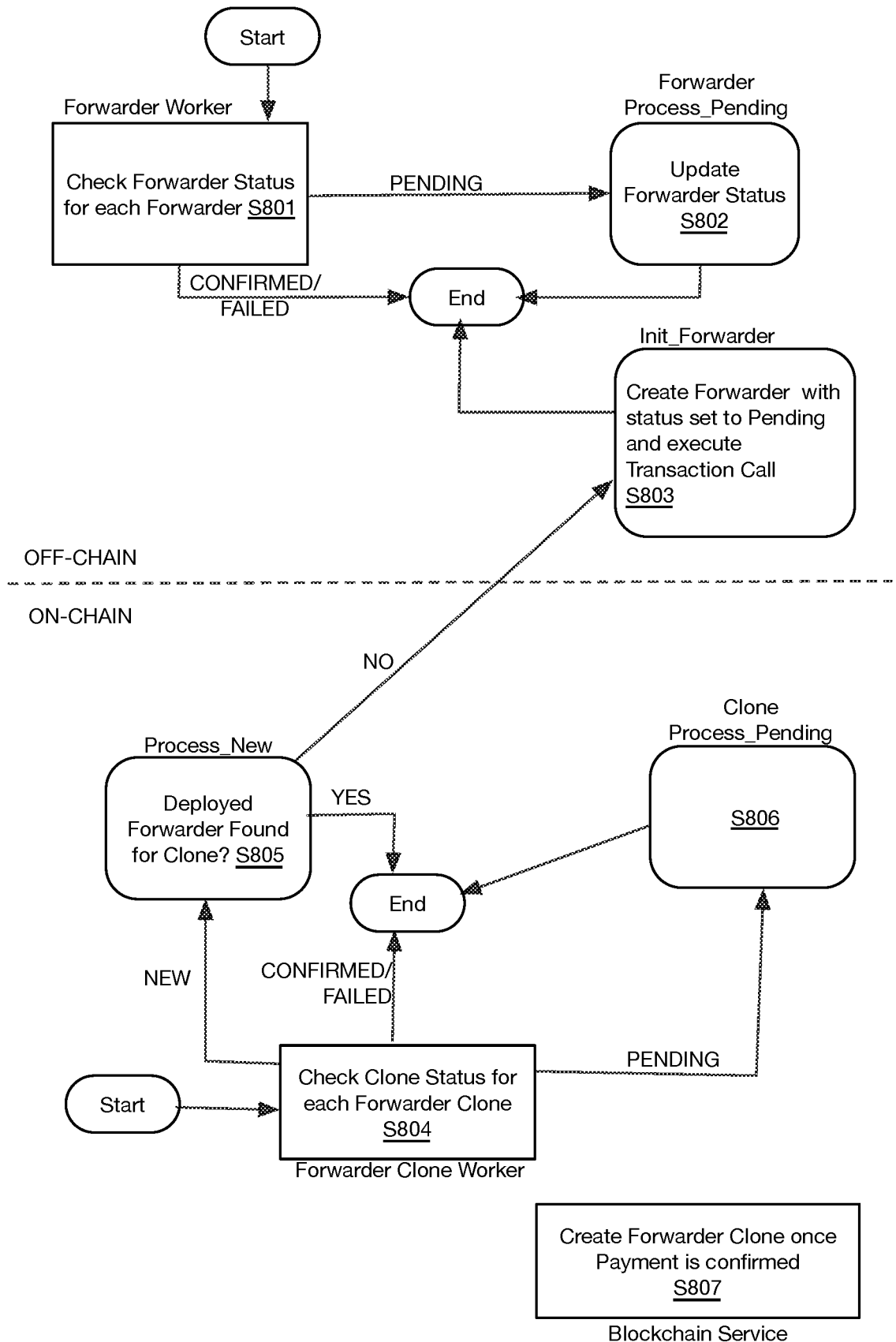
FIGS. 8A-D are representations of a method, in accordance with embodiments.
Figure 8B:
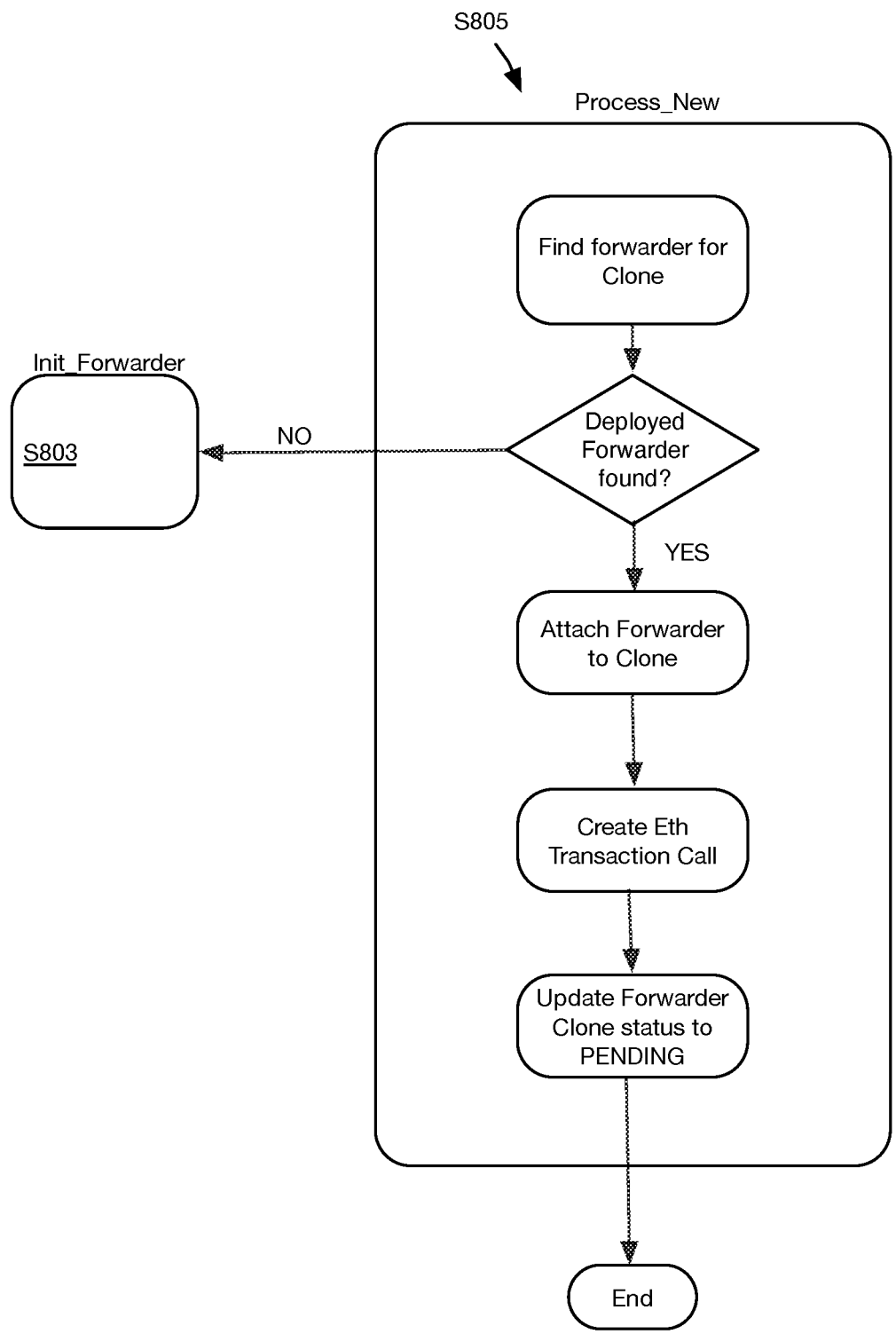
Figure 8C:
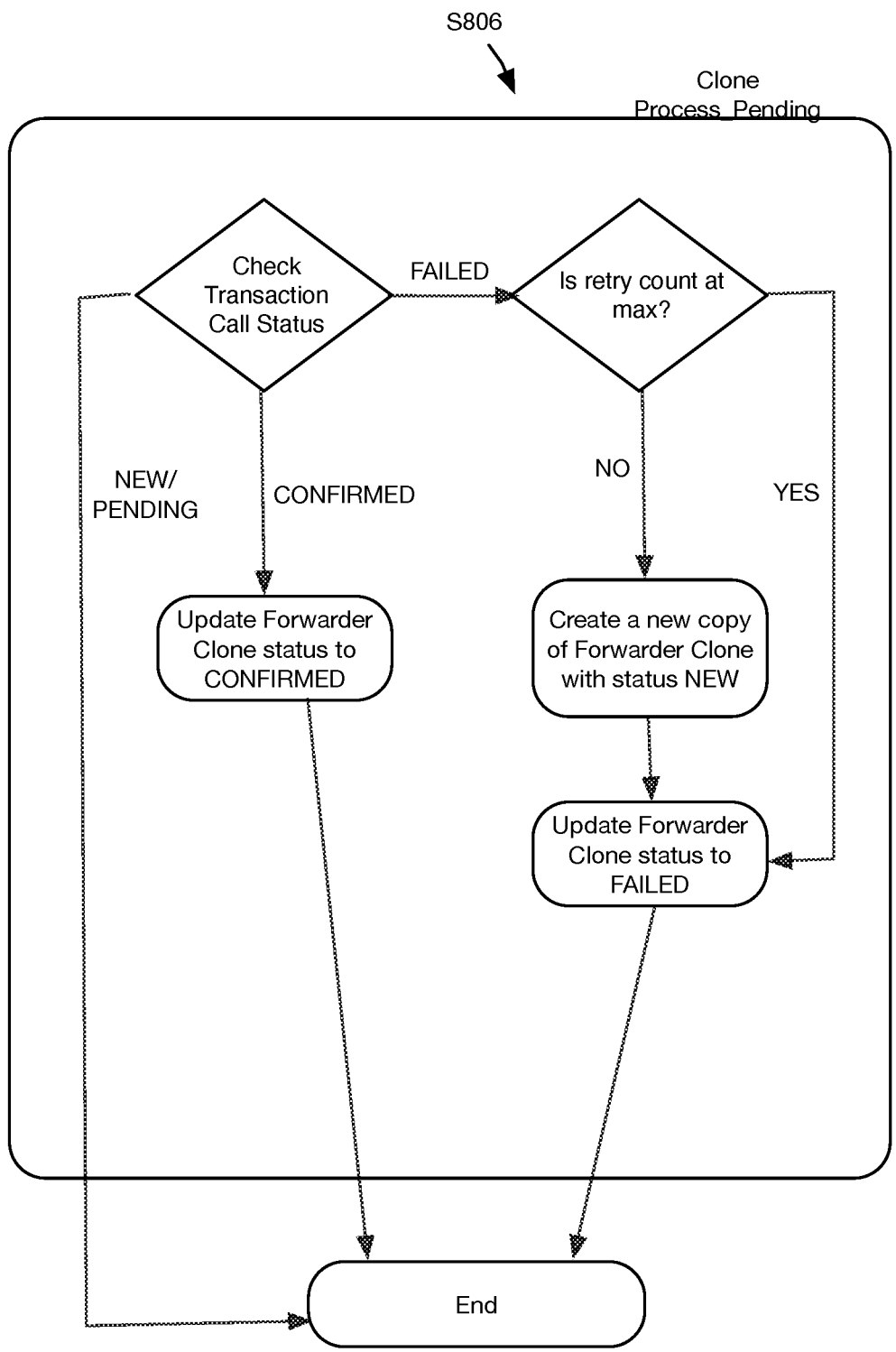
Figure 8D:
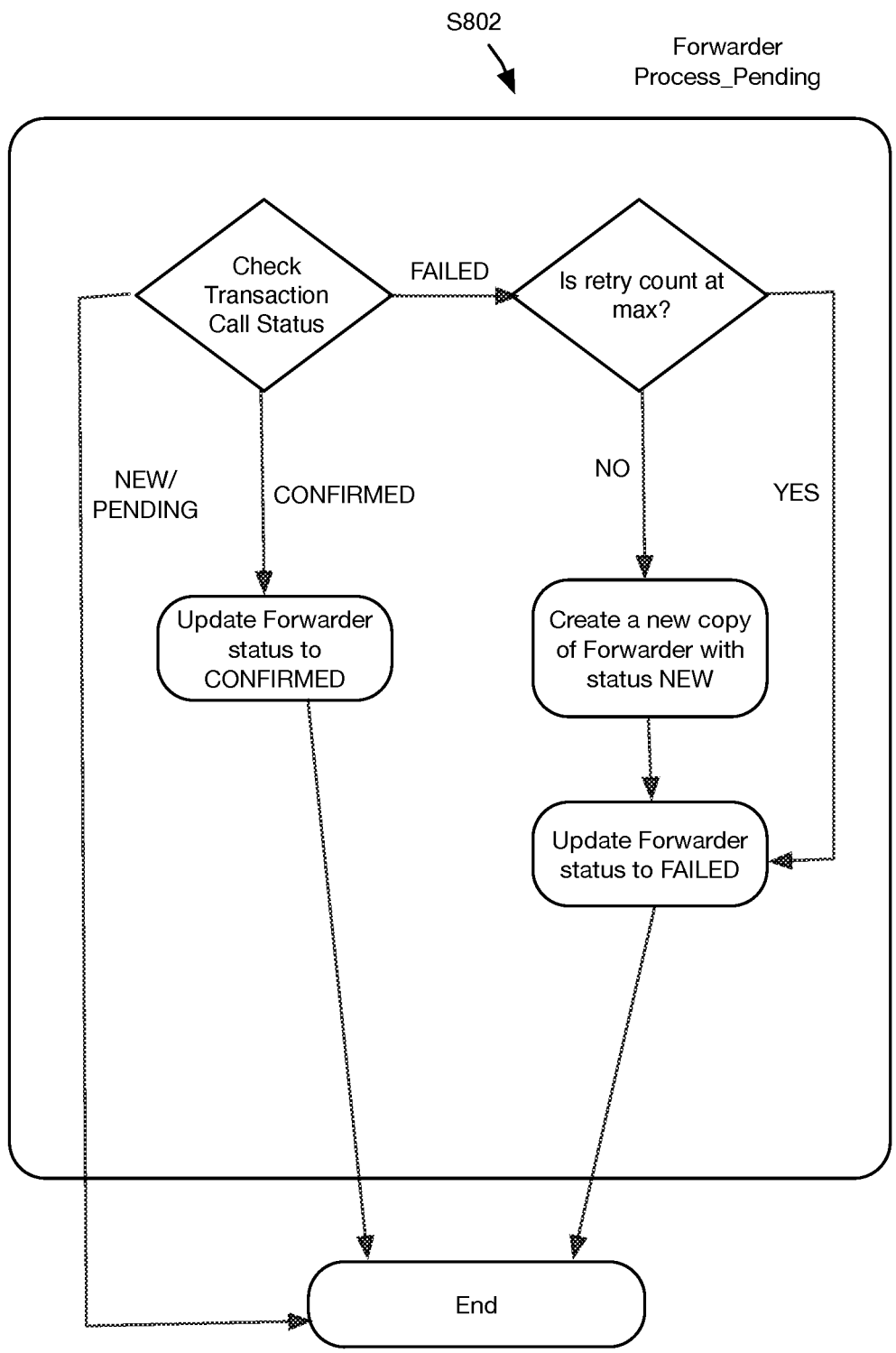

FIGS. 8A-B show state transitions for smart contract (e.g., 160) deployment and parent (e.g., 177) deployment. At S807, the blockchain application system 190 creates a smart contract (e.g., 160). At S804, a forwarder clone worker checks status for the deployed smart contract (e.g., 160). If the status is NEW, processing proceeds to S805. If the status is PENDING, processing proceeds to S806. If the status is CONFIRMED or FAILED, processing ends. FIG. 8B shows a flow diagram for step S805. FIG. 8C shows a flow diagram for step S806. At S805, if a deployed parent (e.g., 177) is not found for the smart contract (e.g., 160), then a parent is initiated at S803 and its status is set to PENDING. At S801, a forwarder worker checks forwarder status for the parent (e.g., 177). If the status is CONFIRMED or FAILED, then processing ends. If the status is PENDING, then processing proceeds to S802. At S802, the parent's status is updated, as shown in FIG. 8D, which shows a flow diagram for S802.

In a first specific example, the monitoring system receives a withdrawal request from a user specifying a payment destination; generates, signs (e.g., with the private key associated with the smart contract), and broadcasts a payment transfer request (e.g., transaction) to the smart contract transferring payment from the smart contract address to the payment destination; and optionally notifies the user of payment transfer upon confirmation of payment transfer from smart contract to the payment destination. In a second specific example, the method is similar to the first specific example, except that the payments are transferred from the smart contract to a platform-specified, intermediate payment destination (e.g., an on-platform address for the user or for the platform; determined by the platform), and an additional payment transfer transaction from the intermediate payment destination to the user-specified payment destination can be generated, signed (e.g., by the private key associated with the on-platform address), and broadcast to the blockchain for validation (e.g., before user notification).

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A computer system for reducing deployment-related resource usage via a blockchain address cryptographically tied to bytecode of a smart contract, the computer system comprising:

one or more processors; and memory storing computer program instructions that, when executed by the one or more processors, cause operations comprising:

obtaining, from a user device, a payment request comprising a payment destination;

storing bytecode for a second smart contract, wherein the bytecode comprises a reference to a transfer function of a first smart contract on a blockchain;

accessing the bytecode for the second smart contract;

generating a blockchain address using the bytecode for the second smart contract, and transmitting the blockchain address to the user device;

monitoring the blockchain, and detecting a payment on the blockchain to the blockchain address;

in response to detecting the payment to the blockchain address, deploying the second smart contract by broadcasting, to the blockchain, a blockchain transaction comprising the bytecode for the second smart contract;

activating the transfer function of the first smart contract on the blockchain using the reference of the broadcasted bytecode for the second smart contract; and monitoring the blockchain, and detecting a confirmation on the blockchain of a transfer of funds by the second smart contract to the payment destination.

2. The computer system of claim 1, wherein generating the blockchain address comprises generating the blockchain address using a salt and the bytecode for the second smart contract as arguments to a cryptographic algorithm, and wherein the blockchain transaction broadcasted to the blockchain comprises the salt and the bytecode for the second smart contract.

3. The computer system of claim 1, the operations further comprising:

generating a salt using payment information of the payment request, wherein generating the blockchain address comprises generating the blockchain address using the generated salt and the bytecode for the second smart contract as arguments to a cryptographic algorithm.

4. The computer system of claim 1, wherein generating the blockchain address comprises generating the blockchain address using the bytecode for the second smart contract in response to obtaining the payment request from the user device.

5. A method comprising:

obtaining, by a blockchain application system, and from a user device, a payment request comprising a payment destination;

storing, by the blockchain application system, bytecode for a second smart contract, wherein the bytecode comprises a reference to a transfer function of a first smart contract on a blockchain;

accessing, by the blockchain application system, the bytecode for the second smart contract;

generating, by the blockchain application system, a blockchain address using the bytecode for the second smart contract and transmitting, by the blockchain application system, the blockchain address to the user device;

monitoring, by the blockchain application system, the blockchain, and detecting, by the blockchain application system, a payment on the blockchain to the blockchain address;

in response to detecting the payment to the blockchain address, deploying, by the blockchain application system, the second smart contract by broadcasting, to the blockchain, a blockchain transaction comprising the bytecode for the second smart contract;

activating, by the blockchain application system, the transfer function of the first smart contract on the blockchain using the reference of the broadcasted bytecode for the second smart contract; and monitoring, by blockchain application system, the blockchain, and detecting, by blockchain application system, a confirmation on the blockchain of a transfer of funds by the second smart contract to the payment destination.

6. The method of claim 5, wherein generating the blockchain address comprises generating the blockchain address using a salt and the bytecode for the second smart contract as arguments to a cryptographic algorithm, and wherein the blockchain transaction broadcasted to the blockchain comprises the salt and the bytecode for the second smart contract.

7. The method of claim 5, further comprising:

generating a salt using payment information of the payment request, wherein generating the blockchain address comprises generating the blockchain address using the generated salt and the bytecode for the second smart contract as arguments to a cryptographic algorithm.

8. The method of claim 5, wherein generating the blockchain address comprises generating the blockchain address using the bytecode for the second smart contract in response to obtaining the payment request from the user device.

9. The method of claim 5, wherein the blockchain transaction broadcasted to the blockchain comprises a create operation code of a blockchain virtual machine associated with the blockchain.

10. The method of claim 5, wherein the second smart contract is a minimal proxy contract of the first smart contract.

11. One or more non-transitory computer-readable media storing computer program instructions that, when executed by one or more processors, perform operations comprising:

obtaining, from a user device, a payment request comprising a payment destination;

storing bytecode for a second smart contract, wherein the bytecode comprises a reference to a transfer function of a first smart contract on a blockchain;

accessing the bytecode for the second smart contract;

generating a blockchain address using the bytecode for the second smart contract, and transmitting the blockchain address to the user device;

monitoring the blockchain, and detecting a payment on the blockchain to the blockchain address;

in response to detecting the payment to the blockchain address, deploying the second smart contract by broadcasting, to the blockchain, a blockchain transaction comprising the bytecode for the second smart contract;

activating the transfer function of the first smart contract on the blockchain using the reference of the broadcasted bytecode for the second smart contract; and monitoring the blockchain, and detecting a confirmation on the blockchain of a transfer of funds by the second smart contract to the payment destination.

12. The one or more non-transitory computer-readable media of claim 11, wherein generating the blockchain address comprises generating the blockchain address using a salt and the bytecode for the second smart contract as arguments to a cryptographic algorithm, and wherein the blockchain transaction broadcasted to the blockchain comprises the salt and the bytecode for the second smart contract.

13. The one or more non-transitory computer-readable media of claim 11, the operations further comprising:

generating a salt using payment information of the payment request,
wherein generating the blockchain address comprises generating the blockchain address using the generated salt and the bytecode for the second smart contract as arguments to a cryptographic algorithm.

14. The one or more non-transitory computer-readable media of claim 11, wherein generating the blockchain address comprises generating the blockchain address using the bytecode for the second smart contract in response to obtaining the payment request from the user device.

15. The one or more non-transitory computer-readable media of claim 11, wherein the blockchain transaction broadcasted to the blockchain comprises a create operation code of a blockchain virtual machine associated with the blockchain.

16. The one or more non-transitory computer-readable media of claim 11, wherein the second smart contract is a minimal proxy contract of the first smart contract.

* * * * *